United States Patent

[11] 3,615,639

| [72] | Inventors | James W. Carpenter;<br>John D. Mee; Donald W. Heseltine, all of<br>Rochester, N.Y. |
|---|---|---|
| [21] | Appl. No. | 677,058 |
| [22] | Filed | Oct. 23, 1967 |
| [45] | Patented | Oct. 26, 1971 |
| [73] | Assignee | Eastman Kodak Company<br>Rochester, N.Y. |

[54] DIRECT POSITIVE SILVER HALIDE EMULSIONS CONTAINING DYES AS ELECTRON ACCEPTORS AND SPECTRAL SENSITIZERS
29 Claims, No Drawings

[52] U.S. Cl............................................... 96/130,
   96/101, 260/152, 260/240.6, 260/290, 260/302
[51] Int. Cl........................................................ G03c 1/10
[50] Field of Search............................................ 96/101,
   102, 105, 106

[56] References Cited
UNITED STATES PATENTS
| 2,927,026 | 3/1960 | Haseltine et al. ............. | 96/102 |
| 3,314,796 | 4/1967 | Gotze et al..................... | 96/106 |
| 3,326,688 | 6/1967 | Jenkins et al. ................. | 96/102 |

OTHER REFERENCES
Basaglia et al., Chemical Abstracts, Vol. 59, pgs. 15,411–15,412, (1963).

*Primary Examiner*—J. Travis Brown
*Attorneys*—W. H. J. Kline, J. R. Frederick and Ogden H. Webster

ABSTRACT: Novel polymethine dyes are provided which feature an imidazole ring joined at the carbon atom in the 5-position of the imidazole ring to a dimethine linkage, the imidazole ring having fused to the [a] side thereof the nonmetallic atoms required to complete at least one fused ring, and a second desensitizing nucleus joined at a carbon thereof to the dimethine linkage. The invention also provides novel photographic silver halide emulsions, including direct positive emulsions containing the dyes of the invention.

DIRECT POSITIVE SILVER HALIDE EMULSIONS CONTAINING DYES AS ELECTRON ACCEPTORS AND SPECTRAL SENSITIZERS

This invention relates to novel photographic material, and more particularly to a new class of polymethine dyes, to intermediates and methods for preparing these new dyes, to novel photographic emulsions containing these dyes, and to photographic elements prepared with such emulsions.

It is known that direct positive images can be obtained with certain types of photographic silver halide emulsions. Many dyes which have been proposed as spectral sensitizers for direct positive emulsions have various disadvantages, such as high D min., low speed, or undesired spectral distribution in exposed area. Some dyes proposed in the prior art are free from one or more of these disadvantages when the emulsion is fresh, but not during storage. There is a need in the art, therefore, for dyes which impart sensitivity primarily to blue or green radiation, have good stability on storage and are free from the above disadvantages.

It is, accordingly, an object of this invention to provide a new class of dyes which function as electron acceptors and spectral sensitizers for photographic silver halide emulsions.

Another object of this invention is to provide new and improved light-sensitive photographic emulsions, such as fogged, direct positive emulsions, containing one or more of the new dyes of this invention.

A further object of this invention is to provide photographic elements comprising a support having thereon at least one layer containing a novel light-sensitive silver halide emulsion of this invention.

Another object is to provide means for the preparation of such novel dyes and photographic material of this invention.

Other objects of this invention will be apparent from this disclosure and the appended claims.

We have now found that polymethine dyes derived from certain imidazoles having fused rings thereon, and containing desensitizing nuclei therein, are outstanding electron acceptors and spectral sensitizers in direct positive type photographic silver halide emulsions. They provide superior reversal systems, especially with fogged silver halide emulsions, that are characterized by both good speed and desired sensitivity to radiation in the green to red region of the spectrum, with maximum sensitivity occurring in most cases in the region of about 525–600 nm. Some dyes of the invention are especially useful as sensitizers for blue radiation. The images produced with these new direct positive emulsions are clear and sharp, and of excellent contrast. In addition, the direct positive emulsions containing the novel dyes of this invention have better stability on storage than direct positive emulsions prepared with sensitizing dyes suggested in the prior art.

The new class of polymethine dyes of the invention include those comprising first and second 5-to 6-membered nitrogen-containing heterocyclic nuclei joined by a dimethine linkage; the first of said nuclei comprising an imidazole ring joined at the carbon atom in the 5-position (which is not necessarily the 5-position in the numbering of the compound) to said linkage, said imidazole ring having fused, on the [a] side thereof, the nonmetallic atoms to complete at least one ring containing from five to six atoms; and, said second nucleus being a desensitizing nucleus joined at a carbon atom thereof to said linkage. Reference should be made to formulas I and II below for the numbering used for the imidazole ring. These numbers are generally not retained in numbering specific compounds, as will be apparent from the examples.

Some highly useful dyes of the invention include those comprising first and second 5-and 6-membered nitrogen-containing heterocyclic nuclei joined by a dimethine linkage; the first of said nuclei comprising an imidazo ring joined at the 5-carbon atom thereof to said linkage, said imidazole ring having fused on the [a] side thereof the atoms to complete a nucleus selected from the group consisting of an imidazo[1,2-a]-pyridine nucleus, an imidazo[2,1-b]thiazole nucleus, an imidazo[2,b8-b]oxazole nucleus, an imidazo[2,1-b]selenazole nucleus, an imidazo[2,1-b]-1,3,4-thiadiazole nucleus; and said second nucleus being a desensitizing nucleus joined at a carbon atom thereof to said linkage.

The preferred polymethine dyes of the invention include those represented by the following general formulas:

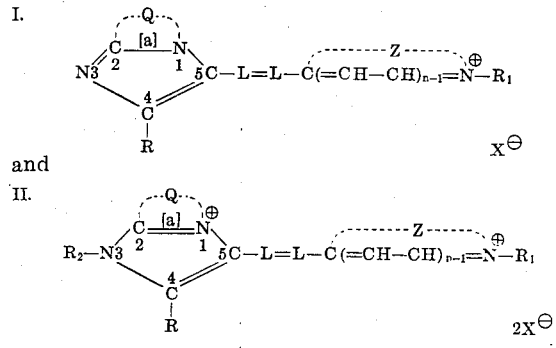

wherein $n$ represents a positive integer of from 1 to 2, L represents a methine linkage, e.g., $-CH$, $-C(CH_3)$, $-C(C_6H_5)$ etc., R represents a hydrogen atom, an alkyl group such as methyl, ethyl, propyl, isopropyl, butyl, hexyl, cyclohexyl, decyl, dodecyl, etc., or preferably an aryl group, e.g., phenyl, tolyl, xylyl, bromophenyl, chlorophenyl, nitrophenyl, methoxyphenyl, naphthyl, phenylazophenyl, etc.; $R_1$ and $R_2$ each represents an alkyl group (including substituted alkyl), preferably a lower alkyl group containing from one to four carbon atoms, e.g., methyl, ethyl, propyl, isopropyl, butyl, hexyl, cyclohexyl, decyl, dodecyl, etc., an alkoxyalkyl group, e.g., $\beta$-methoxyethyl, $\omega$-butoxybutyl, etc., a hydroxyalkyl group, e.g., $\beta$-hydroxyethyl, $\omega$-hydroxybutyl, etc., a carboxyalkyl group, e.g., $\beta$-carboxyethyl, $\omega$-carboxybutyl, etc., a sulfoalkyl group, e.g., $\beta$-sulfoethyl, $\gamma$-sulfobutyl, $\omega$-sulfobutyl, etc., a sulfatoalkyl group, e.g., $\beta$-sulfatoethyl, $\omega$-sulfatobutyl, etc., an acyloxyalkyl group, e.g., $\beta$-acetoxyethyl, $\gamma$-propionyloxypropyl, $\omega$-butyryloxybutyl, etc., an alkoxycarbonylalkyl, e.g., $\beta$-methoxycarbonylethyl, $\omega$-methoxycarbonylbutyl, etc., and the like, or an alkenyl group, e.g., allyl, 1-propenyl, 2-butenyl, or an aryl group, e.g., phenyl, tolyl, xylyl, chlorophenyl, methoxyphenyl, naphthyl, etc., and the like; X represents an acid anion, e.g., chloride, bromide, iodide, thiocyanate, sulfamate, perchlorate, p-toluenesulfonate, methyl sulfate, ethyl sulfate, etc., Z represents the nonmetallic atoms necessary to complete a desensitizing heterocyclic nucleus selected from the group including a nitrobenzothiazole nucleus, e.g., 5-nitrobenzothiazole, 6-nitrobenzothiazole, 5-chloro-6-nitrobenzothiazole, etc., a nitrobenzoxazole nucleus, e.g., 5-nitrobenzoxazole, 6-nitrobenzoxazole, 5-chloro-6-nitrobenzoxazole, etc., a nitrobenzoselenazole nucleus, e.g., 5-nitrobenzoselenazole, 6-nitrobenzoselenazole, 5-chloro-6-nitrobenzoselenazole, etc., an imidazo[4,5-b]quinoxaline nucleus, e.g., imidazo[4,5-b]quinoxaline, 1,3-dialkylimidazo[4,5-b]quinoxaline such as 1,3-diethylimidazo[4,5-b]quinoxaline, 6-chloro-1,3-diethylimidazo[4,5-b]quinoxaline, etc., 1,3-dialkenylimidazo[4,5-b]quinoxaline such as 1,3-diallylimidazo[4,5-b]quinoxaline, 6-chloro-1,3-diallylimidazo[4,5-b]quinoxaline, etc., 1,3-diarylimidazo[4,5-b]quinoxaline such as 1,3-diphenylimidazo[4,5-b]-quinoxaline, 6-chloro-1,3-diphenylimidazo[4,5-b]quinoxaline, etc.; a 3,3-dialkyl-3H-pyrrolo[2,3-b]pyridine nucleus, e.g., 3,3-dimethyl-3H-pyrrolo[2,3-b]pyridine, 3,3-diethyl-3H-pyrrolo[2,3-b]pyridine, etc., a 3,3-dialkyl-3H-nitroindole, e.g., 3,3-dimethyl-5-nitro-3H-indole, 3,3-diethyl-5-nitro-3H-indole, 3,3-dimethyl-6-nitro-3H-indole, etc.; a thiazolo[4,5-b]quinoline, nucleus; or a nitroquinoline, e.g., 5-nitroquinoline, 6-nitroquinoline, etc.

and Q represents the nonmetallic atoms required to complete at least one fused heterocyclic ring containing from five to six atoms in said ring, which ring may also contain a second or third heteroatom such as oxygen, sulfur, selenium or nitrogen such as a pyridine ring, e.g., pyridine, an alkylpyridine such as a methylpyridine, and ethylpyridine, etc., a chloropyridine, a methoxypyridine, a nitropyridine, a phenylpyridine, etc. ring; a thiazole ring, e.g., thiazole, 4-methylthiazole, 5-methylthiazole, 4,5-dimethylthiazole, 4-phenylthiazole, 5-phenylthiazole, 4,5-diphenylthiazole, etc., ring; an oxazole ring, e.g., oxazole, 4-methyloxazole, 5-methyloxazole, 4,5-dimethyloxazole, 4-phenyloxazole, 5-phenyloxazole, etc., ring; a selenazole ring, e.g., selenazole, 4-methylselenazole, 5-methylselenazole, 4,5-dimethylselenazole, 4-phenylselenazole, 5-phenylselenazole, etc. ring; a 1,3,4-thiadiazole ring, e.g., 1,3,4-thiadiazole, a 2-alkyl-1,3,4-thiadiazole such as 2-methyl-1,,4-thiadiazole, a 2-aryl-1,3,4-thiadiazole such as 2-phenyl-1,3,4-thiadiazole, etc., 2-chloro-1,3,4-thiadiazole, 2-nitro-1,3,4-thiadiazole, etc. ring; a pyridazine, e.g., pyridazine, an alkylpyridazine such as 3-methylpyridazine, 3-butylpyridazine, etc., a chloropyridazine such as 3-chloropyridazine, etc., an arylpyridazine such as 3-phenylpyridazine, 3,6-diphenylpyridazine, etc., an alkoxypyridazine such as 4-ethoxypyridazine, a quinoline ring, etc. Other desensitizing nuclei defined by Z in above formula I that are useful include nitrothiazole, nitronaphthothiazole, nitrooxazole, nitronaphthoxazole, nitroselenzole, nitronaphthoselenazole, and nitropyridine, and the like. The monosalt dyes defined by formula I above are particularly efficacious in photographic reversal processes and are preferred.

The polymethine dyes of the invention defined above are powerful electron acceptors for direct positive photographic silver halide emulsions. In addition, they are also useful in photographic silver halide emulsions generally, for example as desensitizers in emulsions used in the process described in Stewart and Reeves, U.S. Pat. No. 3,250,618, issued May 10, 1966.

As used herein and in the appended claims, "desensitizing nucleus" refers to those nuclei which, when converted to a symmetrical carbocyanine dye and added to gelatin silver chlorobromide emulsion containing 40 mole percent chloride and 60 mole percent bromide, at a concentration of from 0.01 to 0.2 grams dye per mole of silver, cause by electron trapping at least about an 80 percent loss in the blue speed of the emulsion when sensitometrically exposed and developed three minutes in Kodak developer D-19 at room temperature. Advantageously, the desensitizing nuclei are those which, when converted to a symmetrical carbocyanine dye and tested as just described, essentially completely desensitize the test emulsion to blue radiation (i.e., cause more than about 90 to 95 percent loss of speed to blue radiation).

The polymethine dyes defined by formula I above are conveniently prepared, for example, by heating a mixture of (1) a heterocyclic compound of the formula:

III.

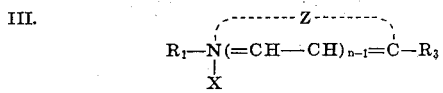

$$R_1-N(=CH-CH)_{n-1}=C-R_3$$
$$\phantom{R_1-N(=CH-CH)_{n-1}=}|$$
$$\phantom{R_1-N(=CH-CH)_{n-1}}X$$

wherein $n$, $R_1$, $R_2$, X and Z are as previously defined, and $R_3$ represents methyl, ethyl, benzyl, etc., and (2) a heterocyclic compound of the formula:

IV.

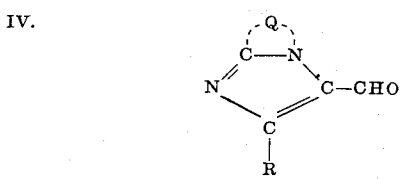

wherein R and Q are as previously defined, in approximately equimolar proportions in a suitable solvent medium such as acetic anhydride. The crude dyes are then separated from the reaction mixtures and purified by one or more recrystallizations from appropriate solvents such as ethanol, methanol, cresol/methanol mixtures, etc.

To prepare the dyes defined by formula II above, a mixture of (1) a compound of above Formula III and (2) a compound of the formula:

V.

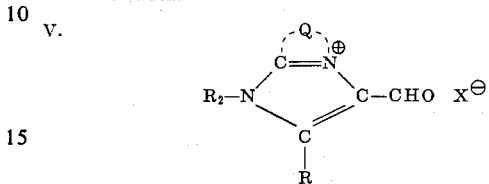

wherein R, $R_2$ and Q are as previously defined, in reacted and the purified dyes obtained in a manner similar to that described above for preparing the dyes of formula I above.

The intermediates defined by formula IV above are conveniently prepared by formulating a compound of the formula:

VI.

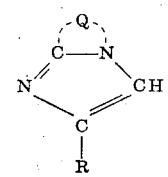

wherein R and Q are as previously defined, by the Vilsmeier reaction comprising treating with phosphoryl chloride in dimethylformamide, followed by hydrolysis with aqueous sodium hydroxide. After chilling, the precipitated crystals are collected, and washed well with water, and further purified, when necessary, by one or more recrystallizations from solvents such as acetone, ethanol, chloroform/ethanol mixtures, and the like. The salt intermediates defined by formula V above are readily prepared by quaternizing compounds represented by formula IV above with any suitable quaternizing reagents, such as represented by methyl iodide, dimethyl sulfate, diethyl sulfate, methyl p-toluenesulfonate, and the like.

In accordance with the invention, novel and improved direct positive photographic silver halide emulsions are prepared by incorporating one or more of the polymethine dyes of the invention into a suitable fogged silver halide emulsion. The emulsion can be fogged in any suitable manner, such as by light or with chemical fogging agents, e.g., stannous chloride, formaldehyde, thiourea dioxide and the like. The emulsion may be fogged by the addition thereto of a reducing agent, such as thiourea dioxide, and a compound of a metal more electropositive than silver, such as a gold salt, for example, potassium chloroaurate, as described in British Pat. 723,019 (1955).

Typical reducing agents that are useful in providing such emulsions include stannous salts, e.g., stannous chloride, hydrazine, sulfur compounds such as thiourea dioxide, phosphonium salts such as tetra(hydroxymethyl) phosphonium chloride, and the like. Typical useful metal compounds that are more electropositive than silver include gold, rhodium, platinum, palladium, iridium, etc., preferably in the form of soluble salts thereof, e.g., potassium chloroaurate, auric chloride, $(NH_4)_2PdCl_6$ and the like.

Useful concentrations of reducing agent and metal compound (e.g., metal salt) can be varied over a considerable range. As a general guideline, good results are obtained using about 0.05 to 40 mg. reducing agent per mole of silver halide and about 0.5 to 15.0 mg. metal compound per mole of silver halide. Best results are obtained at lower concentration levels of both reducing agent and metal compound.

The concentration of added dye can vary widely, e.g., from about 50 to 2000 mg. and preferably from about 400 to 800 mg. per mole of silver halide in the direct positive emulsions.

As used herein, and in the appended claims, "fogged" refers to emulsions containing silver halide grains which produce a density of at least 0.5 when developed, without exposure, for 5 minutes at 68° F. in developer Kodak DK-50 having the composition set forth below, when the emulsion is coated at a silver coverage of 50 mg. to 500 mg. per square foot.

DEVELOPER

| | |
|---|---|
| N-Methyl-p-aminophenol sulfate | 2.5 g. |
| Sodium sulfite (anhydrous) | 30.0 g. |
| Hydroquinone | 2.5 g. |
| Sodium metaborate | 10.0 g. |
| Potassium bromide | 0.5 g. |
| Water to make | 1.0 l. |

The dyes of this invention are also advantageously incorporated in direct positive emulsions of the type in which a silver halide grain has a water-insoluble silver salt center and an outer shell composed of a fogged water-insoluble silver salt that develops to silver without exposure. The dyes of the invention are incorporated, preferably, in the outer shell of such emulsions. These emulsions can be prepared in various ways, such as those described in Berriman U.S. Pat. application Ser. No. 448,467, filed Apr. 15, 1965 now U.S. Pat. No. 3,367,778 issued Feb. 6, 1968. For example, the shell of the grains in such emulsions may be prepared by precipitating over the core grains a light-sensitive water-insoluble silver salt that can be fogged and which fog is removable by bleaching. The shell is of sufficient thickness to prevent access of the developer used in processing the emulsions of the invention to the core. The silver salt shell is surface fogged to make it developable to metallic silver with conventional surface image developing compositions. The silver salt of the shell is sufficiently fogged to produce a density of at least about 0.5 when developed for 6 minutes at 68° F. in Developer A below when the emulsion is coated at a silver coverage of 100 mg. per square foot. Such fogging can be effected by chemically sensitizing to fog with the sensitizing agents described for chemically sensitizing the core emulsion, high-intensity light and the like fogging means well known to those skilled in the art. While the core need not be sensitized to fog, the shell is fogged. Fogging by means of a reduction sensitizer, a noble metal salt such as gold salt plus a reduction sensitizer, a sulfur sensitizer, high pH and low pAg silver halide precipitating conditions, and the like can be suitably utilized. The shell portion of the subject grains can also be coated prior to fogging.

DEVELOPER A

| | |
|---|---|
| N-Methyl-p-aminophenol sulfate | 2.5 g. |
| Ascorbic acid | 10.0 g. |
| Potassium metaborate | 35.0 g. |
| Potassium bromide | 1.0 g. |
| Water to | 1 l. |
| pH of | 9.6 |

Before the shell of water-insoluble silver salt is added to the silver salt core, the core emulsion is first chemically or physically treated by methods previously described in the prior art to produce centers which promote the deposition of photolytic silver, i.e., latent image nucleating centers. Such centers can be obtained by various techniques as described herein. Chemical sensitization techniques of the type described by Antoine Hautot and Henri Saubenier in Science et Industries Photographiques, Vol. XXVIII, Jan. 1957, pgs. 1-23 and Jan. 1957, pgs. 57-65 are particularly useful. Such chemical sensitization includes three major classes, namely, gold or noble metal sensitization, sulfur sensitization, such as by a labile sulfur compound, and reduction sensitization, e.g., treatment of the silver halide with a strong reducing agent which introduces small specks of metallic silver into the silver salt crystal or grain.

The dyes of this invention are highly useful electron acceptors in high-speed direct positive emulsions comprising fogged silver halide grains and a compound which accepts electrons, as described and claimed in Illingsworth U.S. Pat. application Ser. No. 609,794, filed Jan. 17, 1967, and titled "Photographic Reversal Materials III." (U.S. Pat. application, Ser. No. 609,794, is a CIP of U.S. Pat. application, Ser. No. 533,448, filed Mar. 11, 1966; and, U.S. Pat. Application, Ser. No. 619,939, filed Mar. 2, 1967, now U.S. Pat. No. 3,501,307 issued Mar. 17, 1970 is a CIP of Ser. No. 533,448.) The fogged silver halide grains of such emulsions are such that a test portion thereof, when coated as a photographic silver halide emulsion on a support to give a maximum density of at least about one upon processing for 6 minutes at about 68° F. in Kodak DK-50 developer, has a maximum density which is at least about 30 percent greater than the maximum density of an identical coated test portion which is processed for 6 minutes at about 68° F. in Kodak DK-50 developer after being bleached for about 10 minutes at about 68° F. in a bleach composition of:

| | |
|---|---|
| Potassium cyanide | 50 mg. |
| Acetic acid (glacial) | 3.47 cc. |
| Sodium acetate | 11.49 g. |
| Potassium bromide | 119 mg. |
| Water to | 1 l. |

The grains of such emulsions will lose at least about 25 percent and generally at least about 40 percent of their fog when bleached for 10 minutes at 68° F. in a potassium cyanide bleach composition as described herein. This fog loss can be illustrated by coating the silver halide grains as a photographic silver halide emulsion on a support to give a maximum density of at least 1.0 upon processing for 6 minutes at about 68° F. in Kodak DK-50 developer and comparing the density of such a coating with an identical coating which is processed for 6 minutes at 68° F. in Kodak DK-50 developer after being bleached for about 10 minutes at 68° F. in the potassium cyanide bleach composition. As already indicated, the maximum density of the unbleached coating will be at least 30 percent greater, generally at least 60 percent greater, than the maximum density of the bleached coating.

The silver halides employed in the preparation of the photographic emulsion useful herein include any of the photographic silver halides as exemplified by silver bromide, silver iodide, silver chloride, silver chlorobromide, silver bromoiodide, silver chlorobromide, and the like. Silver halide grains having an average grain size less than about 1 micron, preferably less than about 0.5 micron, give particularly good results. The silver halide grains can be regular and can be any suitable shape such as cubic or octahedral, as described and claimed in Illingsworth U.S. Pat. Application Ser. No. 609,778, filed Jan. 17, 1967, and titled "Direct Positive Photographic Emulsions I." (U.S. Pat. Application Ser. No. 609,778 is a CIP of U.S. Pat. Application, Ser. No. 533,400 filed Mar. 11, 1966; and, U.S. Pat. Application, Ser. No. 619,909, filed Mar. 2, 1967, now U.S. Pat. 3,501,306, issued Mar. 17, 1970 is a CIP of Ser. No. 533,400). Such grains advantageously have a rather uniform diameter frequency distribution, as described and claimed in Illingsworth U.S. Pat. Application Ser. No. 609,790, filed Jan. 17, 1967, and titled "Photographic Reversal Emulsion II." (U.S. Pat. Application, Ser. No. 609,790 is a CIP of U.S. Pat. Application, Ser. No. 533,440, filed Mar. 11, 1966; and, U.S. Pat. Application, Ser. No. 619,948, filed Mar. 2, 1967, now U.S. Pat. 3,501,305, issued Mar. 17, 1970, is a CIP of Ser. No. 533,440.) For example, at least 95 percent, by weight, of the photographic silver halide grains can have a diameter which is within about 40 percent, preferably within about 30 percent of the mean grain diameter. Mean grain diameter i.e., average grain size, can be determined using conventional methods, e.g., as shown in an article by Trivelli and Smith entitled "Empirical Relations Between Sensitometric and Size-Frequency Characteristics in Photographic Emulsion Series" in The Photographic Journal, Vol. LXXIX, 1949, pgs. 330–338. The fogged silver halide grains in these direct positive photographic emulsions of this invention produce a density of at least 0.5 when developed without exposure for 5 minutes at 68° F. in Kodak DK–50 developer when such an emulsion is coated at a coverage of 50 to about 500 mg. of silver per square foot of support. The preferred photographic silver halide emulsions comprise at least 50 mole percent bromide, the most preferred emulsions being silver bromoiodide emulsions, particularly those containing less than about 10 mole percent iodide. The photographic silver halides can be coated at silver coverages in the range of about 50 to about 500 milligrams of silver per square foot of support.

In the preparation of the above photographic emulsions, the dyes of the invention are advantageously incorporated in the washed, finished silver halide emulsion and should, of course, be uniformly distributed throughout the emulsion. The methods of incorporating dyes and other addenda in emulsions are relatively simple and well known to those skilled in the art of emulsion making. For example, it is convenient to add them from solutions in appropriate solvents, in which case the solvent selected should be completely free from any deleterious effect on the ultimate light-sensitive materials. Methanol, isopropanol, pyridine, water, etc., alone or in admixtures, have proven satisfactory as solvents for this purpose. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc., and hydrophilic synthetic resins such as polyvinyl alcohol, polyvinyl pyrrolidone, cellulose ethers, partially hydrolyzed cellulose acetate, and the like.

The binding agents for the emulsion layer of the photographic element can also contain dispersed polymerized vinyl compounds. Such compounds are disclosed, for example, in U.S. Pat. Nos. 3,142,568; 3,193,386; 3,062,674 and 3,220,844 and include the water insoluble polymers of alkyl acrylates and methacrylates, acrylic acid, sulfoalkyl acrylates or methacrylates and the like.

The dyes, reducing agents and metal compounds of the invention can be used with emulsions prepared, as indicated above, with any of the light-sensitive silver halide salts including silver chloride, silver bromide, silver chlorobromide, silver bromoiodide, silver chlorobromoiodide, etc. Particularly, useful are direct positive fogged emulsions in which the silver salt is a silver bromohalide comprising more than 50 mole percent bromide. Certain dyes of this invention are also useful in emulsions which contain color formers.

The novel emulsions of this invention may be coated on any suitable photographic support, such as glass, film base such as cellulose acetate, cellulose acetate butyrate, polyesters such as poly(ethylene terephthalate), paper, baryta-coated paper, 1: paper, e.g., polyethylene or polypropylene-coated paper, which may be electron bombarded to promote emulsion adhesion, to produce the novel photographic elements of the invention.

The preparation of the highly useful polymethine dyes of the invention derived from imidazo[1, 2-a]pyridines, and certain intermediates therefor, are illustrated by the following examples.

EXAMPLE 1

3-Ethyl-6-nitro-2-[2-(2-phenylimidazo[1, 2-a]pyrid-3 -yl)vinyl/benzothiazolium iodide.

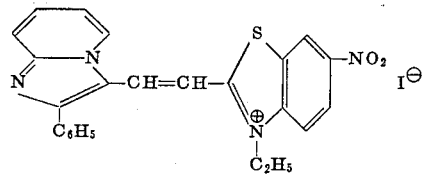

3-Formyl-2-phenylimidazo[1,2-a]pyridine (1.11 g., 1 mol.) and 3-ethyl-2-methyl-6-nitrobenzothiazolium p-toluenesulfonate sulfonate (1.98 g., 1 mol) in acetic anhydride (10 ml.) are heated at reflux for 5 minutes. The cooled mixture is diluted with ether. The ether layer is decanted and the sticky residue dissolved in hot methanol (25 ml.). A solution of sodium iodide (2.0 g.) in a little water is added, the mixture chilled, and the solid collected. After two recrystallizations from methanol, the yield of purified dye is 0.60 g. (21 percent), m.p. greater than 179° C.

The above-prepared dye containing the desensitizing 3-ehtyl-6-nitrobenzothiazole nucleus is photographically tested for its usefulness as an electron acceptor and spectral sensitizer for fogged direct positive photographic silver halide emulsions by the following procedure.

A gelatin silver bromoiodide emulsion (2.5 mole percent of the halide being iodide) and having an average grain size of about 0.2 micron is prepared by adding an aqueous solution of potassium bromide and potassium iodide, and an aqueous solution of silver nitrate, simultaneously to a rapidly agitated aqueous gelatin solution at a temperature of 70° C., over a period of about 35 minutes. The emulsion is chill-set, shredded and washed by leaching with cold water in the conventional manner. The emulsion is reduction gold fogged by first adding 0.2 mg. of thiourea dioxide per mole of silver and heating for 60 minutes at 65° C. and then adding 4.0 mg. of potassium chloroaurate per mole of silver and heating for 60 minutes at 65° C. The dye of the above example, 3-Ethyl-6-nitro-2-[2-(2-phenyl-imidazo[1, 2-a]pyrid-3-yl)vinyl]benzothiazolium iodide is then added to the above fogged emulsion in amount sufficient to give a concentration of 0.08 grams of the dye per mole of silver. The resulting emulsion is coated on a cellulose acetate film support at a coverage of 100 mg. of silver and 400 mg. of gelatin per square foot of support.

A sample of the coated support is then exposed on an Eastman Ib sensitometer using a tungsten light source and processed for 6 minutes at room temperature in Kodak D–19 developer which has the following composition:

| | |
|---|---|
| N-Methyl-p-aminophenol sulfate | 2.0 g. |
| Sodium sulfite (anhydrous) | 90.0 g. |
| Hydroquinone | 8.0 g. |
| Sodium Carbonate (monohydrate) | 52.5 g. |
| Potassium bromide | 5.0 g. |
| Water to make | 1.0 l. | then fixed, washed, and dried. The results are listed in table I hereinafter. Referring thereto, it will be seen that the dye of this example has a maximum density in the unexposed areas of 1.87 and a minimum density in exposed areas of 0.12 a maximum sensitivity of 550 nm. and a relative speed of 339. This result indicates that the dye compound of the above example is well suited to function as both an electron acceptor and spectral sensitizer. It thus provides excellent quality direct positive photographic silver halide emulsions. Excellent magenta images are obtained when the color former 1-(2,4,6-trichlorophenyl)-3-{3-[(2,4-di-tert-phenylphenoxy)acetamido]benzaamido}2-pyrazolin-5-one is incorporated in the emulsion of this example, the emulsion is coated on a support, exposed to a tungsten source through Wratten filter No. 61 and No. 16, and reversal processed as described in Graham et al. U.S. Pat. No. 3,046,129, issued July 24, 1962, in example (a) Col. 27, lines 27 et seq. except that black-and-white (MQ) development is omitted, the color development is reduced to one minute and is conducted in total darkness until after fixing.

EXAMPLE 2

1,3-Diphenyl-2-[2-(2-phenylimidazo[1,2-a]pyrid-3-yl)vinyl]imidazo[4,5-b]quinoxalinium iodide

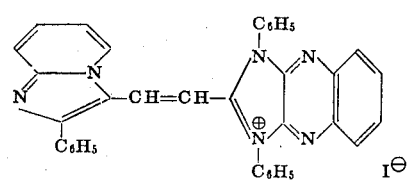

This dye is prepared in a similar manner to that described for example 1, except that 2-methyl-1,3-diphenylimidazo[4,5-b]quinoxalinium p-toluenesulfonate (2.54 g., 1 mol) is used in place of 3-ehtyl-2-methyl-6-nitrobenzothiazolium p-toluenesulfonate. After two recrystallizations from cresol/methanol, the yield of purified dye is 0.83 g. (25 percent), m.p. >300° C.

The above dye containing the desensitizing nucleus 1,3-diphenylimidazo[4,5-b]quinoxaline nucleus is photographically tested by the exact procedure of above example 1. The results as shown in table I hereinafter indicate that this dye qualifies as a good electron acceptor and spectral sensitizer for fogged direct positive photographic emulsions. The densities are shown to be 1.91 and 0.05 for the unexposed and exposed areas, respectively, with a maximum sensitivity at 550 nm. and a relative speed of 468.

EXAMPLE 3

3-Ethyl-2-[2-(1-methyl-2-phenyl-1H-imidazo[1,2-a]pyridinium-3-yl)vinyl]-6-nitrobenzothiazolium diiodide

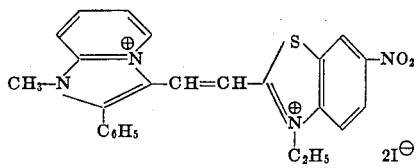

3-Formyl-1-methyl-2-phenyl-1H-imidazo[1,2-a]pyridinium iodide (1.32 g., 1 mol.) and 3-ethyl-2-methyl-6-nitrobenzothiazolium p-toluenesulfonate (1.98 g. 1 mol) in cresol (10 ml.) are heated at reflux for 1 minute. 47 percent aqueous HI (2 ml.) is added to the cooled mixture, then excess ether added. The solid is collected. After two recrystallizations -ethyl-cresol/methanol, the yield of purified dye is 0.44 g. (13 percent), m.p. 257° C., decomposes.

The above dye containing the desensitizing nucleus 3-ehtyl-6-nitrobenzothiazole nucleus, as well has having two quaternary nitrogen atoms (defined by formula II above), are tested by the exact procedure described in above example 1. The results as shown in table 1 hereinafter indicate that this dye does produce moderately good reversal, having densities of 1.43 and 0.13 for the unexposed and exposed areas, respectively, with a relative speed of 138. However, the spectral sensitization is limited to the blue region of the spectrum.

EXAMPLE 4

2-[2-(1-Methyl-2-phenyl-1H-imidazo[1,2-a]pyridinium-3-yl)vinyl]-1,3-diphenylimidazo[4,5-b]quinoxalinium diiodide

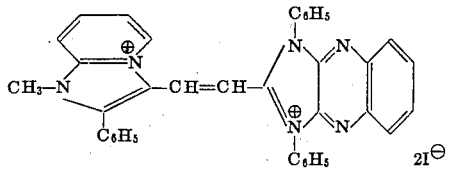

3-Formyl-1-methyl-2-phenyl-1H-imidazo[1,2-a]pyridinium iodide (1.32 g., 1 mol) and 2-methyl-1,3-diphenylimidazo[4,5-b]quinoxalinium p-toluenesulfonate (1.40 g., 1 mol) in acetic anhydride are heated at reflux, with constant stirring, for 5 minutes. The cooled mixture is diluted with ether and the ether layer decanted. The residue is dissolved in methanol (50 ml.) and a solution of sodium iodide (1.0 g.) in a little water added. The mixture is chilled and the solid collected. After two recrystallizations from cresol/methanol, the yield of purified dye is 0.49 g. (22 percent), m.p. >300° C.

Photographic testing of the above dye containing the densensitizing 1,3-diphenylimidazo[4,5-b]quinoxaline nucleus, by the procedure described in above example 1, indicates that it possesses moderate reversal properties showing densities of 1.80 and 0.72 for the unexposed and exposed areas, respectively, with sensitization limited to just the blue region of the spectrum and a relative speed of 50. It will be noted that this dye also contains two quaternary nitrogen atoms and is defined by formula II above.

EXAMPLE 5

3-Ethyl-2-{2-[8-methyl-2-(4-nitrophenyl)imidazo[1,2-a]pyrid-3-yl/vinyl}-6-nitrobenzothiazolium iodide

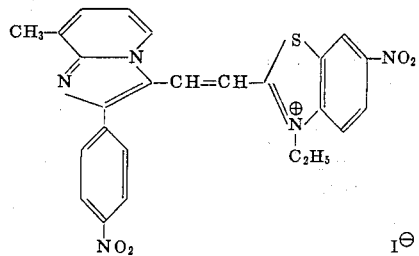

This dye is prepared and purified in a similar manner to that described for example 1, except that 3-formyl-8-methyl-2-(4-nitropheynl)imidazo[1,2-a]pyridine is substituted for the pyridine compound specified in example 1. The yield of purified dye is 0.78 g. (25 percent), m.p. >315° C.

The above dye is photographically tested by the exact procedure described in above example 1 and found to be an excellent electron acceptor and spectral sensitizer for fogged direct positive photographic emulsions. Reference to table I hereinafter, shows that this dye gives densities of 1.96 and 0.02 for the unexposed and exposed areas, respectively, with a maximum sensitivity at 585 nm. and a relative speed of 575.

EXAMPLE 6

1,3-Diethyl-2{2-[8-methyl -2-(4-nitropheynl)imidazo[1,2-a]pyrid-3-yl/vinyl} imidazo[4,5-b]quinoxalinium p-toluenesulfonate

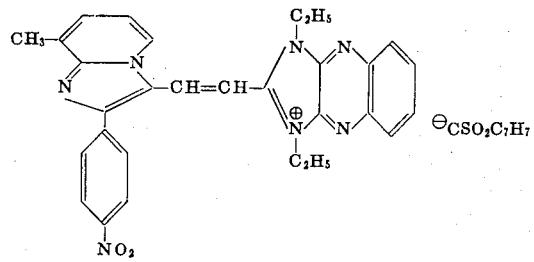

3-Formyl-8-methyl-2-(4-nitrophenyl)imidazo[1,2-a] pyridine (1.41 g., 1 mol), 2-methyl-1,3-diethylimidazo[4,5-b]quinoxalinium p-toluenesulfonate (2.06 g., 1 mol.) and acetic anhydride (20 ml.) are mixed together, refluxed for 30 minutes, chilled and added slowly to ethyl ether (1 l.). The reddish-orange precipitate, which forms, is collected by filtration. After two recrystallizations from methanol, the yield of purified dye is 1.16 g. (34 percent), m.p. 282–7° C., decomposes.

The above dye containing the desensitizing 1,3-diethylimidazo[4,5-b]quinoxaline nucleus is photographically tested for reversal properties by the exact procedure described in above example 1. The results as shown in table I hereinafter indicate that this dye is an excellent electron acceptor and spectral sensitizer for fogged direct positive photographic emulsions. The densities are shown to be 1.98 and 0.02 for the unexposed and exposed areas, respectively, with a maximum sensitivity at 560 and a relative speed of 692. It will be apparent that other salts of this dye such as the chloride, bromide, iodide, perchlorate, methylsulfate, etc. can be readily prepared and that such salts will also be similarly useful in direct positive emulsions.

EXAMPLE 7

6-Chloro-2-{2-[8-methyl-2-(4-nitrophenyl)imidazo[1,2-a] pyrid-3-yl/vinyl} -1,3-diphenylimidazo[4,5-b]quinoxalinium iodide

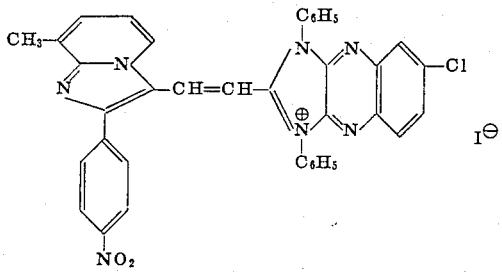

A mixture of 3-formyl-8-methyl-2-(4-nitropheynl)imidazo[eq,2-a]pyridine (1.41 g., 1 mol), 6-chloro-1,3-diphenylimidazo[4,5-b]quinoxalinium p-toluenesulfonate (2.71 g., 1 mol) and acetic anhydride (20 ml., 40 mol) are refluxed for 10 min., cooled and added with stirring to ethyl ether (1 l.). The precipitate is collected by suction filtration, washed with ethyl ether and dried; yield 3.28 g. (81 percent). The p-toluenesulfonate salt is converted to the iodide by dissolving in methanol (100 ml.) treating with sodium iodide (2.0 g.), heating to the boiling point, cooling, filtering, washing with methanol and drying at 100° C. in vacuo for 4 hrs., yield 1.96 g. (51 percent). The iodide is recrystallized from methanol (410 ml./g.); yield 0.70 g. (18 percent), m.p. 310° C., decomposes.

The above-prepared dye containing the desensitizing 1,3-diphenylimidazo[4,5-b]quinoxaline nucleus is tested by the procedure of example 1. The results shown in table I hereinafter indicate that this dye is an outstanding electron acceptor and spectral sensitizer for fogged direct positive photographic emulsions. The densities are 1.74 and 0.04 for the unexposed and exposed areas, respectively, the maximum sensitivity is at 595, and the relative speed is 1050.

EXAMPLE 8

1,3,3-Trimethyl-2-{2-[8-methyl-2-(4nitrophenyl 1,2-a]pyrid-3-yl]vinyl} 5-nitro-3H-indolium p-toluensulfonate

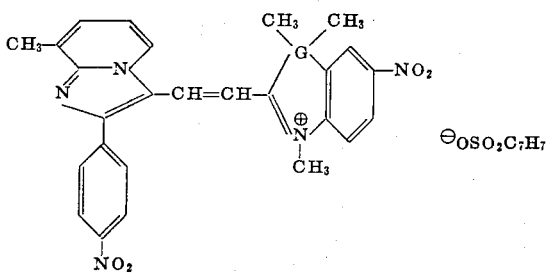

A mixture of 3-formyl-8-methyl-2-(4-nitrophenyl)imidazo[1,2pyridene (1.41 g., 1 mol) 1,2,3,3-tetramethyl-5-nitro-3H-indolium p-toluenesulfonate (1.95 g., 1 mol) acetic anhydride (20 ml., 40 mol) is refluxed for 2½ min., cooled and added with stirring to 955 1. of ethyl ether. The precipitate is collected by suction filtration, washed with ethyl ether and dried; yield 2.98 g. (91 percent). The dye is recrystallized from methanol (85 ml./g.) and dried; yield 2.39 g. (73 percent), m.p. 253–255° C., decomposes.

The above dye containing the 1,3,3-trimethyl-5-nitro3H-indoline nucleus is tested by the procedure of above example 1. The results are shown in table I hereinafter. Referring thereto, the densities are 1.88 and 0.04 for the unexposed and exposed areas, respectively, with a maximum sensitivity at 580 nm. and a relative speed of 955 . Accordingly, this dye is also an outstanding electron acceptor and spectral sensitizer for fogged direct positive photographic emulsions.

EXAMPLE 9

1,3,3-Trimethyl-2-{2-[8-methyl-2-(4-phenylazophenyl)imidazo]1,2-9]pyrid-3-yl]vinyl} -5-nitro-3H-indolium p-toluenesulfonate

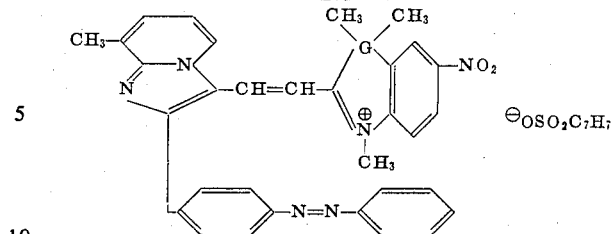

3-Formyl-8-methyl-2-(4-phenylazaopheny)imidazo[1,2-a]pyridine (1.00 g., 1 mol) and 1,2, 3,3-tetramethyl-5-nitro-3H-indolium p-toluenesulfonate (1.15 g., 1 mol) in acetic anhydride (25 ml.) are refluxed for 10 minutes. The cooled reaction mixture is added to ether (300 ml.), stirred and filtered; the precipitate is resuspended in ether (300 ml.), recovered by filtration, and dried; yield 1.84 g. (92 percent). The dye is purified by recrystallization from ethanol (400 ml.); yield 0.79 g. (38 percent), m.p. 241–244° C., decomposes.

Photographic tests in accordance with the procedure of above example 1 indicate, as shown in table I hereinafter, that this dye containing the desensitizing 1,3,3-trimethyl-5-nitro-3H-indole nucleus is a moderately good electron acceptor and spectral sensitizer for direct positive photographic emulsions. The densities are 1.68 and 0.12 for the unexposed and exposed areas, respectively, with a maximum sensitivity at 580 nm. and a relative speed of 603.

EXAMPLE 10

3-Ethyl-2-{2-[8-methyl-2-(4-phenylazaophenyl)imidazo[1,2-a]pyrid-3-yl]vinyl} -6-nitrobenzothiazolium p-toluenesulfonate

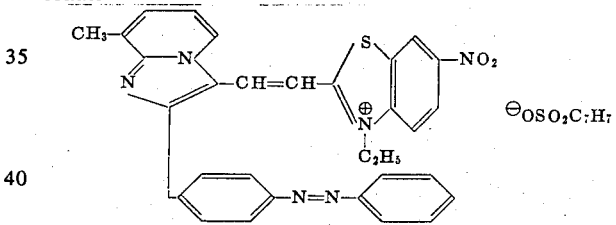

3-Formyl-8-methyl-2-(4-phenylazophenyl)imidazo[1,2-a]pyridine (1.00 g. 1 mol) and 3-ethyl-2-methyl-6-nitrobenzothiazolium p-toluenesulfonate (1.15 g., 1 mol) in acetic anhydride (25 ml.) are refluxed for 15 minutes. The cooled reaction mixture is added to ether (500 ml.), stirred and filtered; the precipitate is resuspended in ether (500 ml.), recovered by filtration, washed with ether and dried; yield 1.71 g. (82 percent). The dye is purified by recrystallization from ethanol (225 ml.); yield 0.53 g. (26 percent), m.p. 194–196° C., decomposes.

The above dye containing the desensitizing 3-ethyl-6-nitrobenzothiazole nucleus is tested for reversal properties by the exact procedure of above example 1. The results shown in table I hereinafter indicate that this dye is a moderately good electron acceptor and spectral sensitizer for fogged direct positive photographic emulsions. The densities are 1.64 and 0.10 for the unexposed and exposed areas, respectively, with a maximum sensitivity at 586 nm. and a relative speed of 501.

EXAMPLE 11

1,3-Diethyl-2-{2-[8-methyl-2-(4-phenylazophenyl)imidazo[1,2-a]-pyrid-3-yl]-vinyl} imidazo[4,5-b]quinoxalinium p-toluenesulfontate

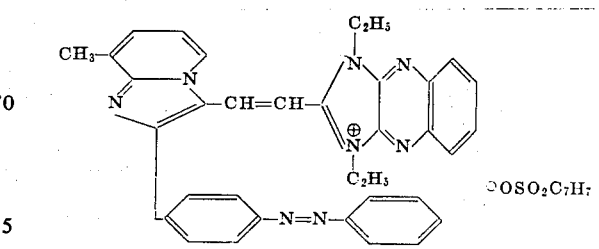

3-Formyl-8-methyl-2-(4-phenylazophenyl)imidazo[1,2-a]pyridine (1.00 g., 1 mol) and 1,3-diethyl-2-methylimidazo[4,5-b]quinoxalinium p-toluenesulfonate (1.19 g., 1 mol) in acetic anhydride (25 ml.) are refluxed for 10 minutes. The chilled reaction mixture is added to ether (300 ml.), stirred and filtered; the precipitate is resuspended in either (300 ml.), recovered by filtration, washed with ether and dried; yield 1.58 g. (74 percent). The dye is purified by recrystallization from ethanol (250 ml.); yield 0.46 g. (23 percent), m.p. 238–240° C.

The above dye containing the desensitizing 1,3-deitheylimidazo[4,5-b]quinoxaline nucleus is found to be a moderately good electron acceptor and spectral sensitizer for photographic reversal systems by the test procedure of above example 1. Table 1 lists the results of this test. Reference thereto shows densities of 1.72 and 0.08 for the unexposed and exposed areas, respectively, with a maximum sensitivity at 580 nm. and a relative speed of 550.

Example 12

1,3-Diethyl-2-{2-[7-methyl2-(4-nitrophenyl)imidazo[1,2-a]pyrid-3-yl]vinyl} imidazo[4,5-b]quinoxalinium p-toluenesulfonate

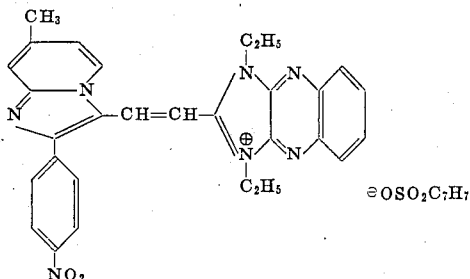

This dye is prepared in the same manner as the dye of above example 11, except that 3-methyl-7-methyl-2-(4-nitrophenyl)imidazo[1,2-a]pyridine is substituted for the pyridine compound of example 11. The yield of dye is 1.42 g. (42percent), m.p. 293–296° C.

This dye containing the desensitizing 1,3-diethylimidazo[4,5-b]quinoxaline quinoxaline nucleus is photographically tested by the procedure described in example 1. The results as shown in table I hereinafter indicate that this dye is an outstanding electron acceptor and spectral sensitizer for fogged direct positive photographic emulsions. The densities are shown to be 1.92 and 0.03 for the unexposed and exposed areas, respectively, with a maximum sensitivity at 575 nm. and a relative speed of 1,380.

EXAMPLE 13

6-Chloro-2-{2-[7-methyl-2-(4-nitrophenyl)imidazo[1,2-a]pyrid-3-yl]vinyl}- 1,3-diphenylimidazo[4,5-b]quinoxalinium iodide

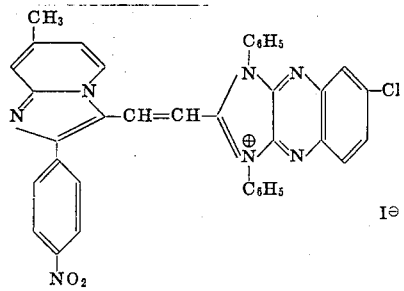

This dye is prepared in the same manner as the dye of example 11, except that the reactants are 3-formyl-7-methyl-2-(4-nitrophenyl)imidazo[,2-a]pyridine and 6-chloro-1,3-diphenylimidazo[4,5-b]quinoxalinium p-toluenesulfonate. The p-toluenesulfonate salt is converted to the iodide by treatment with sodium iodide. The yield of dye is 0.58 g. (15%), m.p. (315° C.)

The above dye containing the desensitizing 6-chloro-1,3-diphenylimidazo[4,5-b]quinoxaline nucleus is tested and found to be an outstanding electron acceptor and spectral sensitizer for fogged direct positive photographic emulsions. The results of the test by the procedure described in above example 1 are listed in table I hereinafter. The densities are 1.84 and 0.06 for the unexposed and exposed areas, respectively, with a maximum sensitivity at 600 nm. and a relative speed of 1,510.

EXAMPLE 14

1,3,3-Trimethyl-2-{2-[7-methyl-2-(4-nitrophenyl)imidazo[1,2-a]vinyl}-5-nitro-3H-indolium p-toluenesulfonate

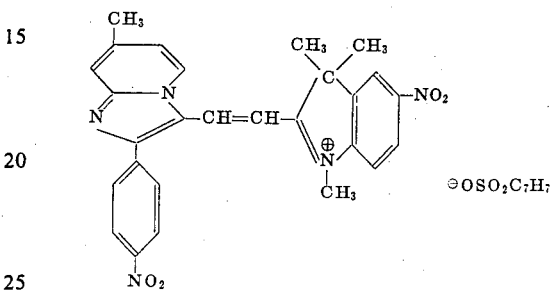

This dye is prepared in the same manner as the dye of example 11, except that the reactants are 3-formyl-7-methyl-2(4-nitrophenyl)imidazo[,2-a]pyridine and 1,2,3,3-tetramethyl-5-nitro-3H-indolium p-toluenesulfonate. The yield of dye is 1.13 g. 35 percent), m.p. 227°–229° C., decomposes.

The above dye containing the desensitizing 1,3,3-trimethyl-5-nitro-3H-indole nucleus is tested by the exact procedure described in above example 1. The results as shown in table I hereinafter indicate that this dye is also an outstanding electron acceptor and spectral sensitizer for fogged direct positive photographic emulsions. The densities are 1.93 and 0.06 for the unexposed and exposed areas respectively, with a maximum sensitivity at 590 nm. and a relative speed of 1,200.

It will be apparent from the foregoing that the intermediates employed in above dye examples 1 to 14 can be substituted by any other of those defined by formula III above to give the corresponding dyes having generally similar properties as electron acceptors and spectral sensitizers for fogged direct positive photographic emulsions, for example, the dye 1-alkyl (e.g., methyl, ethyl, propyl, isopropyl, butyl, decyl, etc.) -6-nitro-2-[3-(2-phenylimidazo[1,2-a]pyrid-3-yl)vinyl]benzoxazolium salt (e.g., the chloride, bromide, iodide, perchlorate, p-toluenesulfonate, etc. salt); the dye 1-alkyl (e.g., methyl, ethyl, propyl, isopropyl, butyl, decyl, etc.)-6-nitro-2-[3-(2-phenylimidazo[1.2-a]pyrid-3-yl)vinyl]selenazolium salt (e.g., the chloride, bromide, iodide, perchlorate, p-toluenesulfonate, etc. salt); the dye 1,3-dialkyl (e.g., wherein alkyl is methyl, ethyl, propyl, isopropyl, butyl, decyl, etc.)-2-{2-[7-(or 8-) methyl-2-(4-nitrophenyl)imidazo[1,2-a]pyrid-3-yl]vinyl} imidazo[4,5-b]quinoxalinium salt (e.g., the chloride, bromide, iodide, perchlorate, p-toluenesulfonate, etc. salt); the dye 1,3-diallyl-2-{2-[8-methyl-2-(4-nitrophenyl)imidazo[1,2-a]pyrid-3-yl]vinyl}imidazo[4,5-b]quinoxalinium salt (e.g., the chloride, bromide, iodide, perchlorate, p-toluenesulfonate, etc. salt); the dye 1,3-dialkyl e.g., wherein alkyl is methyl, ethyl, propyl, isopropyl, butyl, decyl, etc.) -6-chloro-2-{2-[7-(or 8-)methyl-2-(4-nitrophenyl)imidazo[1,2-a]pyrid-3-yl]vinyl}imidazo[4,5-b]quinoxalinium salt, (e.g., the chloride, bromide, iodide, perchlorate, p-toluenesulfonate, etc. salt). and the like. The imidazo[1,2-a]pyridine intermediates employed in the above dye examples 1 to 14 can also be substituted by any other of those defined by formulas IV and V to give the corresponding dyes having generally similar properties as electron acceptors and spectral sensitizers in fogged direct positive photographic emulsions.

The following examples 15 to 23 illustrate the preparations of a number of intermediates defined by formulas IV and V.

EXAMPLE 15

1-Phenylimidazo[1,2-a]pyridine

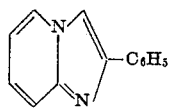

2-Bromoacetophenone (19.9 g., 1 mol.), 2-aminopyridine (1.17 g., 1.2 mol) and sodium bicarbonate (13.1 g., 1.56 mol) in ethanol (80 ml.) are stirred together at room temperature for 3 hours, then heated at reflux for a further 1 hour. The mixture is cooled and diluted to 500 ml. with water. The solid which separates is collected and then washed with water. The yield was 17.5 g. (95 percent), m.p. 137° C. (lit. 135–6° C.). (Kaye, Parris and Burlant, J.A.C.S., 75, 746).

EXAMPLE 16

8-Methyl-2-(4-nitrophenyl)imidazo[1,2-a]pyridine

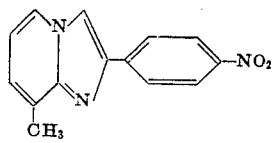

2-Amino-3-methylpyridine (5.41 g., 2 mol) 2-bromo-4'-nitroacetophenone (12.20 g., 2 mol) sodium carbonate (2.65 g., 1 mol) and ethanol (50 ml.) are mixed together and stirred at room temperature for 24 hours. The precipitate is collected by filtration, washed twice with distilled water (400 ml.) and air dried; yield (9.67 g. (76 percent), m.p. 155–160° C. (lit. m.p. 168–171° C.). Ann. Chim. (Rome) 54, 496 (1964), Mattu and Marongiu.

EXAMPLE 17

3-Formyl-2-phenylimidazo[1,2-a]pyridine

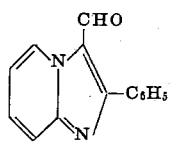

A solution of 2-phenylimidazo[1,2-a]pyridine (9.7 g., 1 mol) in warm dimethylformamide (25 ml.) is added slowly to a mixture of phosphoryl chloride (5 ml.) and dimethylformamide (15 ml.), keeping the temperature below 30° C. The mixture is heated on a steambath for 30 minutes, then poured into water (370 ml.). 50percent NaOH (27 g.) is added slowly; the mixture heated to 90°, with stirring, then chilled. The solid is collected and washed well with water. The yield is 9.6 g. (86 percent), m.p. 140–2° C.

EXAMPLE 18

3-Formyl-8-methyl-2-(4-nitrophenyl)imidazo[1,2-a]pyridine

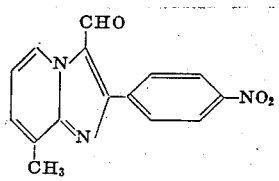

This compound is prepared in a similar manner to that described for example 17. The yield is 9.30 g. (87 percent), m.p. 215–19° C., decomposes.

EXAMPLE 19

3-Formyl-1-methyl-2-phenyl-1H-imidazo[1,2-a]pyridinium iodide

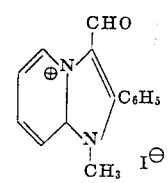

3-Formyl-2-phenylimidazo[1,2-a]pyridine (1.11 g., 1 mol) is dissolved in hot dimethylformamide (2 ml.) and the solution cooled rapidly to give a slush. Methyl iodide (2.8 g., 4 mol) is added and the mixture heated at a gentle reflux for one-half hour, as solid separated. The mixture is cooled and diluted with ether. The solid is collected and washed with ether. Yield 1.25 g. (95 percent), m.p. 226–9° C., decomposes.

EXAMPLE 20

7-Methyl-2-(4-nitrophenyl)imidazo[1,2-a]pyridine

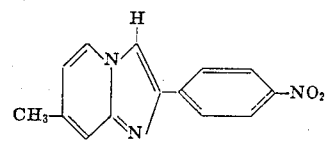

This compound is made in the same manner as the 8-methyl derivative (example 16); yield 10.59 g. (84 percent), m.p. 204–207°C. The material is purified by recrystallization from ethanol (1.1 l.), yield 8.08 g. (64 percent), m.p. 219 221° C. decomposes (lit. m.p. 220° C.; CA, 62, 11801C (1965).

EXAMPLE 21

8-Methyl-2-(4-phenylazophenyl)imidazo[1,2-a]pyridine

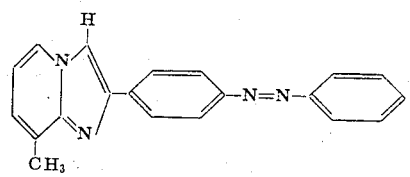

This compound is made in the same manner as 8-methyl-2-(4-nitrophenyl)imidazo[1,2-a]pyridine (example 16) except that 2-bromo-4'-phenylazoacetophenone (15.16 g., 1 mol.) is substituted for 1-bromo-4'-nitroacetophenone; yield 13.00 g. (83 percent). The product is purified by recrystallization from ethanol (800 ml.), 7.70 g. (49 percent), m.p. 193–195° C., decomposes.

EXAMPLE 22

3-Formyl-7-methyl-2-(4-nitrophenyl)imidazo[1,2-a]pyridine

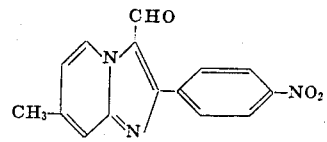

This compound is synthesized in the same manner as the 8-methyl derivative (example 18); yield 8.29 g. (98 percent). The product is purified by recrystallization from chloroformacetone; acetone; yield 5.87 g. (70 percent), m.p. 267–268° C., decomposes.

EXAMPLE 23

3-Formyl-8-methyl-2-(4-phenylazophenyl)imidazo[1,2-a]pyridine

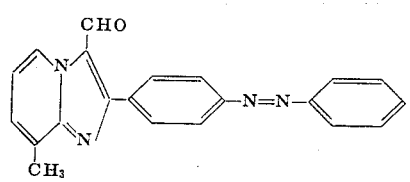

This compound is synthesized in the same manner as the 4-nitrophenyl derivatives; yield 7.85 g. (89 percent). The product is recrystallized twice from ethanol; yield 3.31 g. (37 percent), m.p. 165° C., decomposes.

It will be apparent that still other intermediates defined by formulas IV and V above can be readily prepared by appropriate substitutions in the procedures of above examples 15 to 23.

The preparation of the highly useful polymethine dyes of the invention derived from imidazo[2,1-b]thiazoles, and intermediates therefor, is illustrated by the following examples

EXAMPLE 24

1,3,3-Trimethyl-5-nitro-2-{2-[6-(4-nitrophenyl)imidazo[2,1-b]-thiazol-5-yl]vinyl}-3H-indolium p-toluenesulfonate

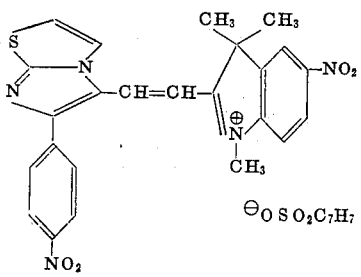

5-Formyl-6-(4-nitrophenyl)imidazo[2,1-b]thiazole 1.37 g., 1 mol) and 1,2,3,3-tetramethyl-5-nitro-3H-indolium p-toluenesulfonate (1.95 g., 1 mol) in acetic anhydride are refluxed for several minutes. The cooled reaction mixture is added to ether (1 l.), stirred and filtered; the precipitate is washed with ether and dried; yield 2.49 g. (77 percent). The dye is purified by recrystallization from methanol (500 ml.); yield 0.93 g. (29 percent), m.p. 247-248° C., decomposes.

This dye containing the densensitizing 1,2,2-trimethyl-5-nitro-3H-indole nucleus is tested by the exact procedure described in above example 1. The results in table 1 hereinafter indicate that this dye is an excellent electron acceptor and spectral sensitizer for fogged direct positive photographic emulsions. The densities are 1.82 and 0.04 for the unexposed and exposed areas, respectively, with a maximum sensitivity at 580 nm. and a relative speed of 832.

EXAMPLE 25

1,3-Diethyl-2-{2-[6-(4-nitrophenyl)imidazo[2,1-b]thiazol-5-yl]vinyl}imidazo[4,5-b]quinoxalinium p-toluenesulfonate

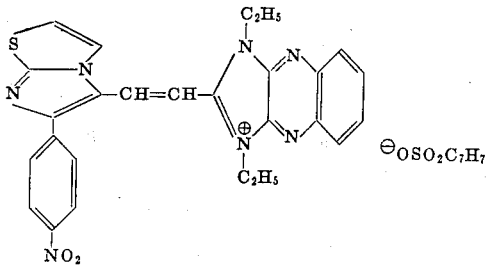

This compound is prepared in a manner similar to example 24; yield 2.97 g. (91 percent). The dye is purified by recrystallization from methanol (380 ml.); yield 0.81 g. (25 percent), m.p. 290-292° C., decomposes.

The above-prepared dye containing the desensitizing imidazo[4,5-b]quinoxaline nucleus is tested as described in above example 1. The results are listed in the following table 1. Referring thereto it will be seen that this dye qualifies as an outstanding electron acceptor and spectral sensitizer for fogged direct positive emulsions giving densities of 1.70 and 0.03 for the unexposed and exposed areas, respectively, with a maximum sensitivity at 550 nm. and a relative speed of 1,100.

EXAMPLE 26

6-Chloro-2-{2-[6-(4-nitrophenyl)imidazo[2,1-b]thiazol-5-yl]vinyl}-1,3-dephenylimidazo[4,5-]quinoxalinium p-toluenesulfonate

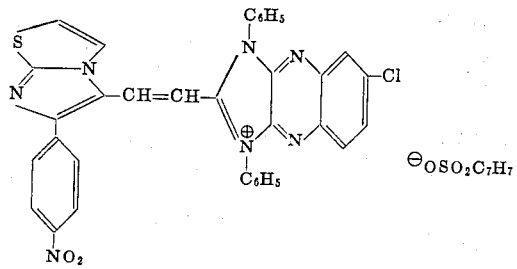

This compound is prepared in a manner similar to examples 24 and 25; yield 2.03 g. (51 percent). The dye is purified by recrystallization from methanol (350 ml.); yield 0.57 g. (14 percent), m.p. 312-315° C., decomposes.

This dye containing the desensitizing imidazo[4,5-b]quinoxaline nucleus shows (table 1 hereinafter) densities of 1.86 and 0.04 for the unexposed and exposed areas, respectively, with a maximum sensitivity at 575 nm. and a relative speed 1.050, as tested by the procedure of above example 1. These results indicate that this dye also is an outstanding electron acceptor and spectral sensitizer for fogged direct positive emulsions.

In place of the intermediates employed in above examples 24, 25 and 26, there can be substituted an equivalent amount of any other of those defined by formulas III and IV above to give the corresponding dyes having generally similar reversal and spectral sensitizing properties for direct positive photographic emulsions. For example, by appropriate selections of intermediates, the following dyes can be readily prepared: the dye 3-alkyl (e.g., methyl, ethyl, propyl, isopropyl, butyl, decyl, etc.) -2-{2-[6-(4-nitrophenyl)imidazo[2,1-b]thiazol-5-yl]vinyl} 6-nitrobenzothiazolium salt (e.g., the chloride, bromide, iodide, perchlorate, p-toluenesulfonate, etc. salt); the dye 3-alkyl (e.g., methyl, ethyl, propyl, isopropyl, butyl, decyl, etc.) -2-{2-[6-(4-nitrophenyl)imidazo[2,1-b]thiazol-5-y]vinyl -6-nitrobenzoxazolium salt (e.g., the chloride, bromide, iodide, perchlorate, p-toluenesulfonate, etc. salt); the dye 3-alkyl (e.g., methyl, ethyl, propyl, isopropyl, butyl, decyl, etc.) -2-{2-[6-(4-nitrophenyl)imidazo[2,1-b]selenazol-5-yl]vinyl}-6-nitrobenzoselenazolium salt (e.g., chloride, p-toluenesulfonate, etc. salt); the dye 2-[2-(6-phenylimidazo[2,1-b]thiazol-5-yl)vinyl]-1,3-diphenylimidazo[4,5-b]quinoxalinium salt (e.g., the chloride, bromide, iodide, perchlorate, p-toluenesulfonate, etc. salt); and the like dyes.

The following examples 27 and 28 illustrate the preparation of imidazo[2,1-b]thiazole intermediates defined by formula IV above.

EXAMPLE 27

6-(4-Nitrophenyl)imidazo[2,1-b]thiazole

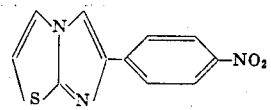

2-Aminothiozole (10.01 g., 1 mol), mol.), 2-bromo-4'-nitroacetophenone (24.40 g., 1 mol) and sodium carbonate (5.30 g., 0.5 mol) in ethanol (100 ml.) are stirred for hours at room temperature. The tan precipitate is collected by suction filtration, washed twice with distilled water (500 ml.) and dried in vacuo at 85° C. for 4 hours; yield 22.7 g. (93 percent), m.p. 181-188°C. The product is purified by recrystallization from ethanol (750 ml.); yield 5.78 g. (24 percent), m.p. 269-272° C. [lit. m.p. 283-4° C. T. Matsukawa and S. Ban, J. Pharm. Soc. Japan, 71, 756-9 (1951), CA. 46, 8094 (1952)].

EXAMPLE 28

5-Formyl-6-(4-nitrophenyl)imidazo[2,1-b]thiazole

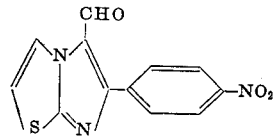

6-(4-Nitrophenyl)imidazo[2,1-b] thiazole (9.32 g., 1 mol) is dissolved in dimethylformamide (150 ml.) and added rapidly to a solution of phosphoryl chloride (5 ml.) in dimethylformamide (15 ml.) at ice bath temperature. The reaction mixture is heated on a steam bath for 1 hr., chilled, added to 370 g. of crushed ice, treated with aqueous sodium hydroxide (27.0 g., 50 percent), heated to 90° C. and chilled. The grayish-brown precipitate is collected by suction filtration, washed with distilled water (300 ml.) and dried; yield 9.37 g. (90 percent), m.p. 248° C. The aldehyde is purified by recrystallization from acetone (2,250 ml.); yield 4.25 g. (41 percent), m.p. 255–256° C., decomposes.

It will be apparent that other intermediates defined by formula IV above can be prepared by appropriate substitutions of the starting reactants in the procedures of above examples 27 and 28.

The preparation of the highly useful polymethine dyes of the invention derived from imidazo[2,1-b]-1,3,4-thiadiazoles, and intermediates therefor, is illustrated by the following examples.

EXAMPLE 29

1,3,3-trimethyl-2-{2-[2methyl-6(4-nitrophenyl)imidazo[2,1-b]-1,3,4-thiadiazol-5-yl]vinyl}-5-nitro-3H-indolium p-toluenesulfonate

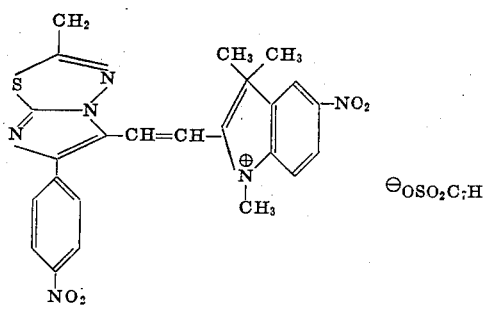

5-Formyl-2-methyl-6-(4-nitrophenyl)imidazo[2,1-b]-1,3,4-thiadiazole (1.00 g.; 1 mol) and 1,2,3,3-tetramethyl-5nitro-3 H-indolium p-toluenesulfonate (1.37 g., 1 mol) in acetic anhydride (25 ml.) are refluxed for 5 minutes. The cooled reaction mixture is added to ether (500 ml.), stirred and filtered; the precipitate is suspended in ether (500 ml.), recovered by filtration, washed with ether and dried; yield 1.93 g. (84 percent). The dye is purified by recrystallization from acetonitrile/acetone, yield 0.26 g. (11 percent), m.p. 232° C., decomposes.

The above prepared dye containing the desensitizing 1,3,3-trimethyl-5-nitro-3H-indole nucleus is tested by the procedure of above example 1. The results shown in table 1 hereinafter indicate this dye to be an excellent electron acceptor and spectral sensitizer for fogged direct positive emulsions. The densities are 1.88 and 0.09 for the unexposed and exposed areas, respectively, with a maximum sensitivity at 560 nm. and a relative speed of 1,000.

EXAMPLE 30

3-Ethyl-2-{2-[2-methyl-6-(4-nitrophenyl)imidazo[2,1-b]-1,3,4-thiadiazol-5-yl]vinyl}-6-nitrobenzothiazolium p-toluenesulfonate

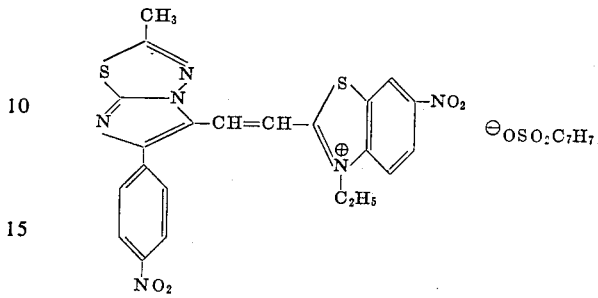

This compound is prepared in a manner similar to example 29; yield 1.71 g. (73 percent). The dye is purified by recrystallization from ethanol (1.3 l.); yield 0.50 g. (21 percent), m.p. 269–270°C., decomposes.

This dye containing the desensitizing 3-ethyl-6-nitrobenzothiazole nucleus is an excellent electron acceptor and spectral sensitizer for fogged direct positive photographic emulsions as indicated by the values listed in table 1 hereinafter. Referring to the table, it will be seen that the densities for this dye are 1.90 and 0.05 for the unexposed and exposed areas, respectively, the maximum sensitivity is 545 nm. and the relative speed is 955.

EXAMPLE 31

1,3-diethyl-2-{2-[2-methyl-6-(4-nitrophenyl)imidazo[2,1-b]-1,3,4-thiadiazol-5-yl]vinyl} imidazo [4,5-b]quinoxalinium p-toluenesulfonate

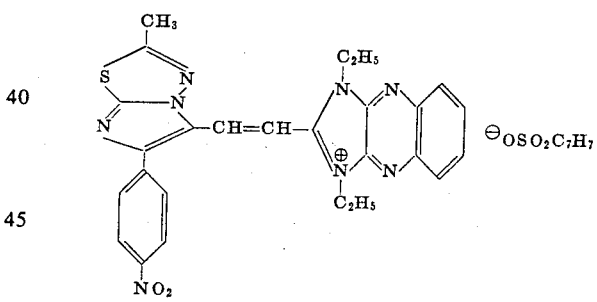

This dye is made in a manner similar to examples 29 and 30; yield 1.52 g. (64 percent). The compound is purified by recrystallization from acetonitrile/acetone; yield 0.32 g. (13 percent), m.p. 278–280°C., decomposes.

This dye containing the desensitizing 1,3-diethylimidazo[4,5-b]quinoxaline nucleus qualifies as an excellent electron acceptor and spectral sensitizer for fogged direct positive emulsions showing in table 1 hereinafter, densities of 1.78 and 0.05 for the unexposed and exposed areas, respectively, with a maximum sensitivity of 535 nm. and a relative speed of 871.

In place of the intermediates employed in above examples 29, 30 and 31, there can be substituted an equivalent amount of any other of those defined by formulas III and IV above to give the corresponding dyes having generally similar reversal and spectral-sensitizing properties for direct positive photographic emulsions. For example, by appropriate selections of intermediates, the following dyes can be readily prepared; the dye 3-alkyl (e.g., methyl, ethyl, propyl, isopropyl, butyl, decyl, etc.)-2-{2-[2-methyl-6-(4-nitrophenyl)imidazo[2,1-b]-1,3,4-thiadiazol-5yl]vinyl}-6-nitrobenzothiazolium salt (e.g., the chloride, bromide, iodide, perchlorate, p-toluenesulfonate, etc. salt); the dye 3-alkyl (e.g., methyl, ethyl, propyl, isopropyl, butyl, decyl, etc.) -2-{2-[2-methyl-6-(4-nitrophenyl)imidazo[2,1-b]-1,3,4-thiadiazol-5-yl]vinyl}-6-nitrobenzoxazolium salt (e.g., the chloride, bromide, iodide, perchlorate, p-toluenesulfonate, etc. salt); the dye 2-[2-(6-phenylimidazo[2,1-b]-1,3,4-thiadiazol-5-yl)vinyl]-1,3-diphenylimidazo[4,5-b]quinoxalinium salt (e.g., the chloride, bromide, iodide, perchlorate, p-toluenesulfonate, etc. salt); and the like dyes.

The following examples 32 and 33 illustrate the preparation of imidazo [2,1-b]-1,3,4-thiadiazole intermediates defined by formula IV above.

EXAMPLE 32

2-methyl-6-(4-nitrophenyl)imidazo[2,1-b]-1,3,4-thiadiazole

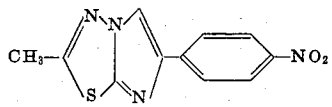

2-Amino-5-methyl-1,3,4-thiadiazole (5.80 g., 1 mol) and 2-bromo-4'-nitroacetophenone (12.20 g., 1 mol) in ethanol (200 ml.) are refluxed for 30 minutes. The hot reaction mixture is filtered to obtain a yellow precipitate which is dried in vacuo at 85° C.; yield 14.45 g. (80 percent) of the hydrobromide salt, m.p. 234–236° C. The precipitate is suspended in distilled water (775 ml.) and refluxed for one hour; the hot reaction mixture is filtered to obtain a yellow precipitate which is dried in vacuo at 90° C.; yield 9.26 g. (71 percent), m.p. 243–245° C. [lit. m.p. 241–242° C., T. Matsukawa and S. Ban., J. Pharm. Soc. Japan, 72, 610–4 (1952); CA 47, 6409 (1953)].

EXAMPLE 33

5-Formyl-2-methyl-6-(4-nitrophenyl)imidazo[2,1-b]-1,3,4-thiadiazole

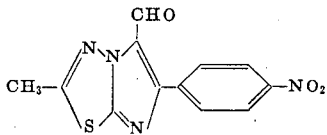

2-Methyl-6-(4-nitrophenyl)imidazo[2,1-b]-1,3,4-thiadiazole (13.00 g., 1 mol) is suspended in dimethylformamide and added rapidly to a solution of phosphoryl chloride. (5.04 ml.) in dimethylformamide (15 ml.) at ice bath temperature. The reaction mixture is heated on a stem bath for 2 hrs., chilled, added to 370 g. of crushed ice, treated with aqueous sodium hydroxide (27.0 g., 50 percent), heated to 90° C. and chilled. The tan precipitate is collected by suction filtration, washed with distilled water and dried; yield 13.15 g. (91 percent). The aldehyde is purified by recrystallization from ethanol (2 l.); yield 6.61 g. (46 percent), m.p. 189°C.

It will be apparent that other intermediates defined by formula IV above can be prepared by appropriate substitutions of the reactants in the procedures of above examples 32 and 33.

The preparation of the highly useful polymethine dyes of the invention derived from imidazo[1,2-b]pyridazines, and intermediates therefor, is illustrated by the following examples.

EXAMPLE 34

2-{2-[2-(4-Bromophenyl)-6-chloroimidazo[1,2-b]pyridazin-3-yl]vinyl}-3-ethyl-6-nitrobenozthiazolium p-toluenesulfonate

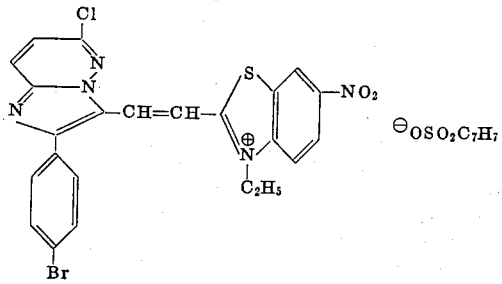

2-(4-Bromophenyl)-6-chloro-3-formylimidazo[1,2-b]pyridine (1.38 g., 1 mol) and 3-ethyl-2-methyl-6-nitrobenzothiazolium p-toluenesulfonate (1.62 g., 1 mol) in acetic anhydride (20 ml.) are refluxed for 2 minutes. The cooled reaction mixture is added to ether (1 l.), stirred and filtered; the precipitate is purified by recrystallization from methanol/ethanol; yield 0.89 g. (30 percent), m.p. 270–272° C., decomposes.

The above-prepared dye containing the desensitizing 3-ethyl-6-nitrobenzothiazole nucleus is tested by the procedure of above example 1. The results, as shown in table 1 hereinafter, indicate that this dye is a good quality, excellent electron acceptor and spectral sensitizer for fogged direct positive photographic emulsions. It gives densities of 1.74 and 0.09 for the unexposed and exposed areas, respectively, with a maximum sensitivity at 555 nm. and a relative speed of 525.

EXAMPLE 35

2-{2-[2-(4-Bromophenyl)-6pyridazine 1,2-b]pyridazin-3-yl]vinyl}-1,3-diethylimidazo[4,5-b]quinoxalinium p-toluenesulfonate

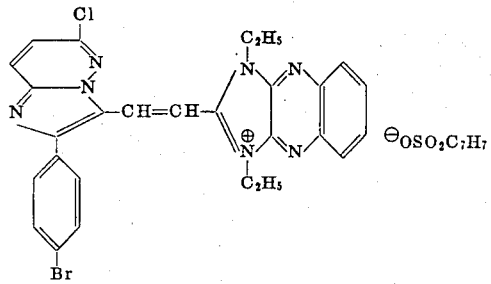

2-(4-Bromophenyl)-6-chloro-3-formylimidazo[1,2-b]pyridazine (1.38 g., 1 mol) and 1,3-diethyl-2-methylimidazo[4,5-b]quinoxalinium p-toluenesulfonate (1.69 g., 1 mol) in acetic anhydrite (20 ml.) are refluxed for 2 minutes. The cooled reaction mixture is added to ether (1 l.), stirred and filtered; the precipitate is washed with ether and dried; yield 2.01 g. (67 percent). The dye is purified by recrystallization from ethanol; yield 0.76 g. (25 percent), m.p. 289–291°C., Dec.

The exact photographic test procedure described in above example 1 is carried out with the above prepared dye which contains the desensitizing 1,3-diethylimidazo[4,5-b]quinoxaline nucleus. The results are recorded in table 1 hereinafter. Referring to the table, the densities are shown to be 1.54 and 0.06 for the unexposed and exposed areas, respectively, the maximum sensitivity is at 520 nm. and the relative speed is 457. Accordingly, this dye is a good electron acceptor and spectral sensitizer for fogged direct positive emulsions.

EXAMPLE 36

2-{2-[2-(4-Bromophenyl)-6-methoxyimidazo[1,2b]pyridazin-3-yl]vinyl}-1,3,3-trimethyl-5-nitro-3H-indolium p-toluenesulfonate

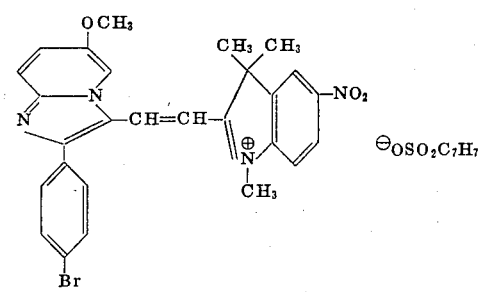

2-(4-Bromophenyl)-3-formyl-6-methoxyimidazo[1,2-b]pyridazine (2.00 g., 1 mol) and 1,2,3,3-tetramethyl-5-nitro-3H-indolium p-toluenesulfonate in acetic anhydride (25 ml.) are refluxed for 15 minutes. The cooled reaction mixture is added to ether (600 ml.), stirred and filtered; the precipitate is washed with ether and dried; yield 3.53 g. (83 percent). The dye is purified by recrystallization from ethanol; yield 2.24 g. (53 percent), m.p. 264–266° C., dec.

The above prepared dye containing the desensitizing 1,3,3-trimethyl-5-nitro-3H-indole nucleus is photographically tested by the exact procedure described in above example 1. The results as shown in table 1 hereinafter indicate that this dye is a very good quality electron acceptor and spectral sensitizer for fogged direct positive emulsions. Densities are shown to be 1.64 and 0.12 for the unexposed and exposed areas, respectively, the maximum sensitivity is at 558 nm. and the relative speed is 955.

EXAMPLE 37

2-{2-[2-(4-Bromophenyl)-6-chloroimidazo[1,2-b]pyridazin-3-yl]vinyl}-1,3,3-trimethyl-5-nitro-3H-indolium p-toluenesulfonate

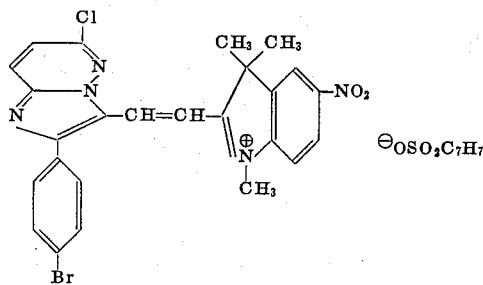

2-(4-Bromophenyl)-6-chloro-3-formylimidazo[1,2-b]pyridazine (1.38 g., 1 mol) and 1,2,3,3-tetramethyl-5-nitro-3H-indolium p-toluenesulfonate in acetic anhydride (20 ml.) are refluxed for 10 minutes. The cooled reaction mixture is added to ether (1 l.) stirred and filtered; the precipitate is washed with ether and dried; yield 2.21 g. (86 percent). The dye is purified by recrystallization from ethanol; yield 1.17 g. (42 percent), m.p. 244–245° C., Dec.

This dye containing the desensitizing nucleus 1,3,3-trimethyl-5-nitro-3H-indole nucleus is tested by the procedure of above example 1. The results are listed in table 1 hereinafter. Referring to the table, it will be seen that the densities are 1.74 and 0.12 for the unexposed and exposed areas, respectively, the maximum sensitivity is at 540 nm. and the relative speed is 631. Accordingly, this dye qualifies as a good electron acceptor and spectral sensitizer for fogged direct positive emulsions.

EXAMPLE 38

2-{2-[2-(4-Bromophenyl)-6-methoxyimidazo[1,2-b]pyridazin-3-yl]vinyl}-3ethyl-6-nitrobenzothiazolium p-toluenesulfonate

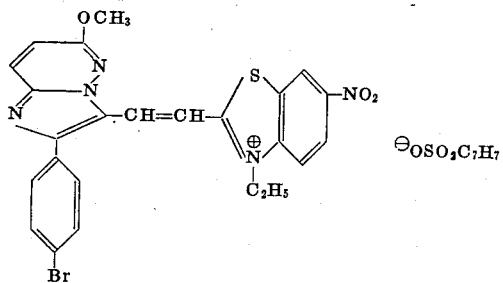

2-(4-Bromophenyl)-3-formyl-6-methoxyimidazo[1,2-b]-pyridazine (2.00 g., 1 mol) and 3-ethyl-2-methyl-6-nitrobenzothiazolium p-toluenesulfonate (2.37 g., 1 mol) in acetic anhydride (25 ml.) are refluxed for 3 minutes. The cooled reaction mixture is added to ether (500 ml.), stirred and filtered; the precipitate is washed with ether and dried; yield 3.45 g. (85 percent). The dye is recrystallized from chloroform; yield 2.16 g. (53 percent), m.p. 279–281° C., dec.

The exact photographic test procedure of above example 1 is carried out with the above dye which contains the desensitizing 1-ethyl-6-nitrobenzothiazole nucleus. The results are recorded in table 1 hereinafter. The table shows densities of 1.70 and 0.07 for the unexposed and exposed areas, respectively, with a maximum sensitivity at 550 nm. and a relative speed of 725. This dye is, therefore, considered as being an excellent electron acceptor and spectral sensitizer for fogged direct positive emulsions.

EXAMPLE 39

2-{2-[2-(4-Bromophenyl)-6-methoxyimidazo[1,2-b]pyridazine-3-yl/vinyl}-1,3-diethylimidazo[4,5-b]quinoxalinium p-toluenesulfonate

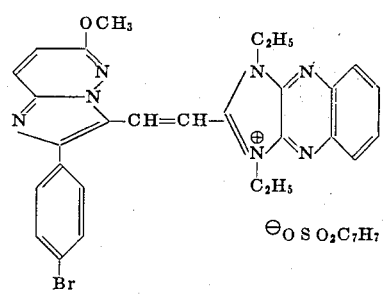

2-(4-Bromophenyl)-3-formyl-6-methoxyimidazo[1,2-b]pyridazine (2.00 g., 1 mol) and 1,3-diethyl-2-methylimidazo[4,5-b]quinoxalinium p-toluenesulfonate (2.47 g., 1 mol) in acetic anhydride (25 ml.) are refluxed for 2 minutes. The cooled reaction mixture is added to ether (500 ml.), stirred and filtered; the precipitate is washed with ether and dried; yield 2.96 g. (68 percent). The dye is purified by recrystallization from ethanol; yield 0.81 g. (18 percent), m.p. 284–296°C., dec.

The above-prepared dye containing the desensitizing 1,3-diethylimidazo[4,5-b]quinoxaline nucleus is photographically tested by the procedure described in above example 1. The results are set forth in table 1 hereinafter. Referring to the table, it will be seen that the densities obtained with this dye are 1.68 and 0.05 for the unexposed and exposed areas, respectively, with a maximum sensitivity at 530 nm. and a relative speed of 832. Accordingly, this dye is an excellent electron acceptor and spectral sensitizer for fogged direct positive emulsions.

In place of the intermediates employed in above examples 34 to 39, there can be substituted an equivalent amount of any other of those defined by formulas III and IV above to give the corresponding dyes having generally similar reversal and spectral sensitizing properties for direct positive photographic emulsions. For example, by appropriate selections of intermediates, the following dyes can be readily prepared: the dye 2-{2[2-(4-chlorophenyl)-6-chloroimidazo[1,2-b]pyridazin-3-yl]vinyl}-3-alkyl (e.g., methyl, ethyl, propyl, isopropyl, butyl, decyl, etc.) -6-nitrobenzothiazolium salt (e.g., the chloride, bromide iodide, perchlorate, p-toluenesulfonate, etc. salt); the dye 2-{2-[2-(4-bromophenyl)-6-methoxyimidazo[1,2-b]pyridazin-3-yl]vinyl}-3-alkyl (e.g., methyl, ethyl, propyl, isopropyl, butyl, decyl, etc.) -6-nitrobenzoxazolium salt (e.g., the chloride, bromide iodide, perchlorate, p-toluenesulfonate, etc. salt); the dye 2-{2-[2-(4-bromophenyl)-6-chloroimidazo[1,2-b]pyridazin-3-yl]vinyl}-1,3-diphenylimidazo[4,5-b]quinoxalinium salt (e.g., the chloride, bromide, iodide, perchlorate, p-toluenesulfonate, etc. salt); and the like dyes.

The following examples 40 to 43 illustrate the preparation of imidazo[1,2-b]pyridazin intermediates defined by formula IV above.

EXAMPLE 40

2-(4-Bromophenyl)-6-chloroimidazo[1,2-b]pyridazine

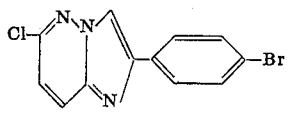

3-Amino-6-chloropyridazine (5.78 g., 1 mol) and α, p-dibromoacetophenone (13.9 g., 1 mol) in ethanol (150 ml.) are refluxed for 3 hrs. The cooled reaction mixture is filtered to obtain a colorless precipitate; yield 6.93 g. (45 percent), m.p. 220–222° C. (lit. m.p. 222° C.). [C.A., 64, 3566 (1966), Japan, 22,264 (1965)].

EXAMPLE 41

2-(4-Bromophenyl)-6-methoxyimidazo[1,2-b]pyridazine

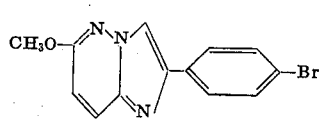

3-Amino-6-methoxypyridazine (12.50 g., 1 mol) and α, P-dibromoacetophenone (5.63 g., 1 mol) in ethanol (150 ml.) are refluxed for 2 hrs. The cooled reaction mixture is filtered to obtain a colorless precipitate; yield 11.96 g. (87 percent), m.p. 197–199° C.

EXAMPLE 42

2-(4-Bromophenyl)-6-chloro-3-formylimidazo[1,2-b]pyridazine

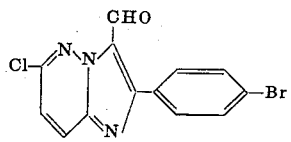

A mixture of 2-(4-bromophenyl-6-chloroimidazo[1,2-b]pyridazine (6.93 g., 1 mol) in hot dimethylformamide (75 ml.) is added slowly to a solution of phosphoryl chloride (2.5 ml.) and dimethylformamide (15 ml.) at ice bath temperature. The reaction mixture is heated on a steam bath for 1 hr., cooled, added with stirring to 370 g. of crushed ice, treated with aqueous sodium hydroxide (50 percent, 27.0 g.), heated to 90° C., cooled and filtered. The precipitate is resuspended in water (500 ml.), recovered by suction filtration and dried; yield 6.96 g. (94 percent). The aldehyde is purified by recrystallization from chloroform/ethanol; yield 4.65 g. (63 percent), m.p. 194–197°C.

EXAMPLE 43

2-(4-Bromophenyl)-3-formyl-6-methoxyimidazo[1,2-b]pyridazine

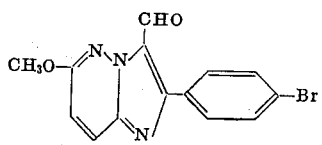

This compound is prepared in a manner similar to that described for example 42. The yield is 6.82 g. (79 percent), m.p. 153–156° C.

It will be apparent that other intermediates defined by formula IV above can be prepared by appropriate substitutions of reactants in the procedures of above examples 40 to 43.

The effectiveness of the dyes of the above examples as electron acceptors and spectral sensitizers for fogged direct positive photographic emulsions is determined by the exact procedure described in above example 1. The results are listed in the following table.

TABLE I

| Dye of Ex. No. | Dye conc., g./mole silver | Relative clear speed | Density Max. unexposed areas | Density Min. exposed areas | Sensitizing max. (nm.) |
| --- | --- | --- | --- | --- | --- |
| 1 | 0.45 | 339 | 1.87 | 0.12 | 550 |
| 2 | 0.45 | 468 | 1.91 | 0.05 | 550 |
| 3 | 0.96 | 138 | 1.43 | 0.13 | Blue |
| 4 | 0.45 | 50 | 1.80 | 0.72 | Blue |
| 5 | 0.70 | 575 | 1.96 | 0.02 | 585 |
| 6 | 0.70 | 692 | 1.98 | 0.02 | 560 |
| 7 | 0.75 | 1,050 | 1.74 | 0.04 | 595 |
| 8 | 0.50 | 955 | 1.88 | 0.04 | 580 |
| 9 | 0.75 | 603 | 1.68 | 0.12 | 580 |
| 10 | 0.75 | 501 | 1.64 | 0.10 | 586 |
| 11 | 0.75 | 550 | 1.72 | 0.08 | 580 |
| 12 | 0.75 | 1,380 | 1.92 | 0.03 | 575 |
| 13 | 0.75 | 1,510 | 1.84 | 0.06 | 600 |
| 14 | 0.75 | 1,200 | 1.93 | 0.06 | 590 |
| 24 | 0.50 | 832 | 1.82 | 0.04 | 580 |
| 25 | 0.75 | 1,100 | 1.70 | 0.03 | 550 |
| 26 | 0.75 | 1,050 | 1.86 | 0.04 | 575 |
| 29 | 0.75 | 1,000 | 1.88 | 0.09 | 560 |
| 30 | 0.50 | 955 | 1.90 | 0.05 | 545 |
| 31 | 0.75 | 871 | 1.78 | 0.05 | 535 |
| 34 | 0.50 | 525 | 1.74 | 0.09 | 555 |
| 35 | 0.75 | 457 | 1.54 | 0.06 | 520 |
| 36 | 0.75 | 955 | 1.64 | 0.12 | 558 |
| 37 | 0.50 | 631 | 1.74 | 0.12 | 540 |
| 38 | 0.50 | 725 | 1.70 | 0.07 | 550 |
| 39 | 0.75 | 832 | 1.68 | 0.05 | 530 |
| Control | 0.00 | <1 | 1.90 | No reversal | |

The following examples further illustrate the preparation of fogged, direct positive photographic emulsions and elements with the dyes of the invention.

EXAMPLE 44

To 9.0 pounds of a silver chloride gelatin emulsion containing an equivalent of 100 grams of silver nitrate is added 0.017 gram of 1,3-diethyl-2-{2-[8-methyl-2-(4-nitrophenyl)imidazo[1,2a]pyrid-3-yl]vinyl}imidazo[4,5-b]quinoxalinium p-toluenesulfonate (example 6). The emulsion is coated on a nonglossy paper support, and is flashed with white light to give a density of 1.2 when developed in the following developer, diluted 1 part to 2 parts of water:

| | |
| --- | --- |
| N-methyl-p-aminophenol sulfate | 3.1 grams |
| Sodium sulfite, des. | 45 grams |
| Hydroquinone | 12 grams |
| Sodium carbonate, des. | 67.5 grams |
| Potassium bromide | 1.9 grams |
| Water to | 1 liter. |

The light-fogged material can be exposed to an image with light modulated by a Wratten No. 15 filter to give a direct positive image. Generally similar results are obtained when the dyes of examples 7, 24, 25 and 26 are used in place of the above dye.

EXAMPLE 45

Seven pounds of a silver chloride gelatin emulsion containing the equivalent of 100 g. of silver nitrate is heated to 40° C. and the pH is adjusted to 7.8. Eight cc. of full-strength (40 percent) formalin solution is added and the emulsion is held at 40° C. for 10 minutes. At the end of the holding period, the pH is adjusted to 6.0 and 0.125 g. of 6-chloro-2-{2-[7-methyl-2-(4-nitrophenyl)imidazo[1,2-a]pyrid-3-yl]vinyl}-1,3-diphenylimidazo[4,5-b]quinoxalinium iodide (example 13). The emulsion is coated on a support, and provides good direct positive images. Similar results are obtained when the dyes of examples 12, and 14, 29, 30, 31, 38 and 39 are substituted for the above dye.

By substituting other dye compounds of the invention, as defined in formulas I and II above, into the procedure of the above examples, similar fogged, direct positive photographic silver halide emulsions and photographic elements may be prepared.

The photographic silver halide emulsion and other layers present in the photographic elements made according to the invention can be hardened with any suitable hardener, including aldehyde hardeners such as formaldehyde, and mucochloric acid, aziridine hardeners, hardeners which are derivatives of dioxane, oxypolysaccharides such as oxy starch or oxy plant gums, and the like. The emulsion layers can also contain additional additives, particularly those known to be beneficial in photographic emulsions, including, for example, lubricating materials, stabilizers, speed increasing materials, absorbing dyes, plasticizers and the like. These photographic emulsions can also contain in some cases additional spectral sensitizing dyes. Furthermore, these emulsions can contain color forming couplers or can be developed in solutions containing couplers or other color generating materials. Among the useful color formers are the monomeric and polymeric color formers, e.g., pyrazolone color formers, as well as phenolic, heterocyclic and open chain couplers having a reactive methylene group. The color-forming couplers can be incorporated into the direct positive photographic silver halide emulsion using any suitable technique, e.g., techniques of the type shown in Jelley et al. U.S. Pat. No. 2,322,027, issued June 15, 1943, Fierke et al. U.S. Pat. No. 2,801,171, issued July 30, 1957, Fisher U.S. Pat. Nos. 1,055,155 and 1,102,028, issued Mar. 4, 1913 and June 30, 1914, respectively, and Wilmanns U.S. Pat. No. 2,186,849 issued Jan. 9, 1940. They can also be developed using incorporated developers such as polyhydroxybenzenes, aminophenols, 3-pyrazolidones, and the like.

Although the invention has been described in considerable detail with particular reference to certain preferred embodiments thereof, it will be understood that variations and modifications can be effected within the spirit and scope of the invention as described hereinabove, and as defined in the appended claims.

We claim:

1. A fogged direct positive photographic silver halide emulsion containing at least one polymethine dye selected from those comprising first and second 5- to 6-membered nitrogen containing heterocyclic nuclei joined by a dimethine linkage; the first of said nuclei comprising an imidazole ring joined at the 5-carbon atom thereof to said linkage, said imidazole ring having fused, on the side thereof, the nonmetallic atoms to complete at least one ring containing from five to six atoms, said nonmetallic atoms selected from the group consisting of carbon, oxygen, sulfur an nitrogen; and, the second of said nuclei being a desensitizing nucleus joined at a carbon atom thereof to said linkage.

2. A direct positive emulsion in accordance with claim 1 wherein said first nucleus is selected from the group consisting of an imidazo[1,2-a]pyridine nucleus; an imidazo[2,1-b]thiazole nucleus; an imidazo[2,1-b]oxazole nucleus; an imidazo[2,1-b]-1,3,4-thiadiazole nucleus; and, an imidazo[1,2-b]pyridazine nucleus.

3. A direct positive emulsion in accordance with claim 2 wherein said dye contains a desensitizing nucleus selected from an imidazo[4,5-b]quinoxaline nucleus and a nitro-substituted desensitizing nucleus.

4. A direct positive emulsion in accordance with claim 1 in which the said silver halide is present in the form of chemically fogged silver halide grains.

5. A direct positive emulsion in accordance with claim 1 in which the said silver halide is present in the form a reduction and gold fogged silver halide grains.

6. A direct positive emulsion in accordance with claim 1 containing a photographic color former.

7. A direct positive, photographic emulsion in accordance with claim 2 which comprises fogged silver halide grains, said grains being such that a test portion thereof, when coated as a photographic silver halide emulsion on a support to give a maximum density of at least about 1 upon processing for 6 minutes at about 68° F. in Kodak DK-50 developer, has a maximum density which is at least about 30 percent greater than the maximum density of an identical coated test portion which is processed for 6 minutes at about є° F. in Kodak DK-50 after being bleached for about 10 minutes at about 68° F. in a bleach composition of:

| | |
|---|---|
| potassium cyanide | 50 mg. |
| acetic acid(glacial) | 3.47 cc. |
| sodium acetate | 11.49 g. |
| potassium bromide | 119 mg. |
| water to | 1 l. |

8. A direct positive, photographic emulsion in accordance with claim 2 which comprises fogged silver halide grains, at least 95 percent, by weight, of said grains having a diameter which is within about 40 percent of the mean grain diameter.

9. A fogged direct positive photographic silver halide emulsion containing at least one dye selected from those having one of the following general formulas:

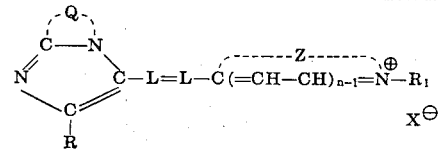

and

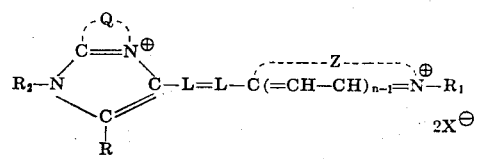

wherein $n$ represents a positive integer of from 1 to 2; L represents a methine linkage; R represents a member selected from the group consisting of a hydrogen atom, an alkyl group and an aryl group, $R_1$ and $R_2$ each represents a member selected from the group consisting of an alkyl group, an alkenyl group and an aryl group; X represents an acid anion; Z represents the nonmetallic atoms necessary to complete a desensitizing nucleus containing five to six atoms; and Q represents the nonmetallic atoms required to complete a fused heterocyclic ring containing from five to six atoms, said nonmetallic atoms required to complete Q selected from the group consisting of carbon, oxygen, sulfur, and nitrogen.

10. A fogged direct positive photographic silver halide emulsion containing at least one dye represented by the following general formula:

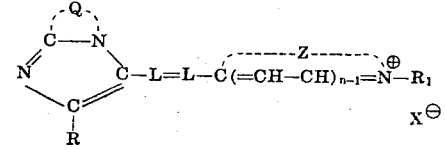

wherein $n$ is a positive integer of from 1 to 2; L represents a methine linkage; R represents a member selected from the group consisting of a hydrogen atom, an alkyl group and an aryl group; $R_1$ represents a member selected from the group consisting of an alkyl group, an alkenyl group and an aryl group; Z represents the nonmetallic atoms necessary to complete a desensitizing nucleus containing five to six atoms; Q represents the nonmetallic atoms required to complete a fused heterocyclic ring containing from five to six atoms, said nonmetallic atoms required to complete Q selected from the group consisting of carbon, oxygen, sulfur, and nitrogen; and, X represents an acid anion.

11. A direct positive emulsion containing a dye as defined by claim 10 wherein said Q represents the nonmetallic atoms required to complete an imidazo[1,2-a]pyridine nucleus.

12. A direct positive emulsion containing a dye as defined by claim 10 wherein said Q represents the nonmetallic atoms required to complete an imidazo[2,1-b]thiazole nucleus.

13. A direct positive emulsion containing a dye as defined by claim 10 wherein said Q represents the nonmetallic atoms required to complete an imidazo[2,1-b]-1,3,4-thiadiazole nucleus.

14. A direct positive emulsion containing a dye as defined by claim 10 wherein said Q represents the nonmetallic atoms required to complete an imidazo[1,2-b]pyridazine nucleus.

15. A direct positive emulsion in accordance with claim 9 wherein said Q represents the nonmetallic atoms required to complete a nucleus selected from the group consisting of an imidazo[1,2-a]pyridine nucleus; an imidazo[2,1-b]thiazole nucleus; an imidazo[2,1-b]oxazole nucleus; an imidazo[2,1-b]-1,3,4-thiadiazole nucleus; and, an imidazo[1,2-b]pyridazine nucleus.

16. A direct positive emulsion in accordance with claim 15 wherein said Z represents the nonmetallic atoms required to complete a nucleus selected from nitrobenzothiazole, nitrobenzoxazole, nitrobenzoselenazole, 3,3-dialkyl-5-nitro-3H-indole, and imidazo[4,5-b]quinoxaline.

17. A direct positive emulsion in accordance with claim 10 in which the said silver halide is present in the form of chemically fogged silver halide grains.

18. A direct positive emulsion in accordance with claim 10 in which the said silver halide is present in the form of reduction and gold fogged silver halide grains.

19. A direct positive emulsion in accordance with claim 10 containing a photographic color former.

20. A direct positive photographic emulsion in accordance with claim 10 which comprises fogged silver halide grains, said grains being such that a test portion thereof when coated as a photographic silver halide emulsion on a support to give a maximum density of at least about 1 upon processing for 6 minutes at about 68° F. in Kodak DK–50 developer, has a maximum density which is at least about 30 percent greater than the maximum density of an identical coated test portion which is processed for 6 minutes at about 68° F. in Kodak DK–50 developer after being bleached for about 10 minutes at about 68° F. in a bleach composition of:

| | |
|---|---|
| potassium cyanide | 50 mg. |
| acetic acid (glacial) | 3.47 cc. |
| sodium acetate | 11.49 g. |
| potassium bromide | 119 mg. |
| water to | 1 l. |

21. A direct positive photographic emulsion in accordance with claim 10 which comprises fogged silver halide grains, at least 95 percent, by weight, of said grains having a diameter which is within about 40 percent of the mean grain diameter.

22. A direct positive emulsion in accordance with claim 10 containing a dye selected from the group consisting of a 3-ethyl-6-nitro-2-[2-(2-phenylimidazo[1,2-a]pyrid-3-yl)vinyl]-benzothiazolium salt; a 1,3-diphenyl-2-[2-(2-phenylimidazo-[1,2-a]pyrid-3-yl)vinyl]imidazo[-b]quinoxalinium salt; a 3-ethyl-2-[2-(1-methyl-2-phenyl-1H-imidazo-[1,2-a]pyridinium-3-yl)vinyl]-6-nitrobenzothiazolium salt; a 2-[2-(1-methyl-2-phenyl-1H-imidazo[1,2-a]pyridinium-3-yl)vinyl]-1,3-diphenylimidazo[4,5]quinoxalinium salt; a 3-ethyl-2-{2-[8-methyl-2-(4-nitrophenyl)imidazo[1,2-a]pyrid-3 -yl]vinyl}-6-nitrobenzothiazolium salt; a 1,3-diethyl-2-{2-[8-methyl-2-(4-nitrophenyl)imidazo[1,2-a]pyrid-3-yl]vinyl} imidazo[4,5-b]quinoxalinium salt; a 6-chloro-2-{2-[8-methyl-2-(4-nitrophenyl)imidazo[1,2-a]pyrid-3-yl]vinyl}-1,3-diphenylimidazo[4,5-b]quinoxalinium salt; a 1,3,3-trimethyl-2-{2-[8-methyl-2-(4-nitrophenyl)imidazo[1,2-a]pyrid-3yl]vinyl}-5-nitro-3H-indolium salt; a 1,3,3-trimethyl-2-{2-[8-methyl-2-(4-phenylazophenyl)imidazo[1,2-a]pyrid-3-yl]vinyl -5-nitro-3H-indolium salt; a 3-ethyl-2-{2-[8-methyl-2-(4-phenylazophenyl)imidazo[1,2-a]pyrid-3-yl]vinyl}-6-nitrobenzothiazolium salt; a 1,3-diethyl-2-{2-[8-methyl-2-(4-phenylazophenyl)imidazo[-a]pyrid-3-yl]vinyl}imidazo[4,5-b]quinoxalinium salt; a 1,3-diethyl-2-{2-[7-methyl-2-(4-nitrophenyl)imidazo[1,2a]pyrid-3-yl]vinyl}imidazo[4,5-b]quinoxalinium salt; a 6-chloro-2-{2-[7-methyl-2-(4-nitrophenyl)imidazo[1,2-a]pyrid-3-yl]vinyl}-1,3-diphenylimidazo[4,5-b]quinoxalinium salt; a 1,3,3-trimethyl-2-{2-[7-methyl-2-(4-nitrophenyl)imidazo[1,2-a]pyrid-3-yl]vinyl}-5-nitro-3H-indolium salt; a 1,3,3-trimethyl-5-nitro-2-{2-[6-(4-nitrophenyl)imidazo[2,1-b]thiazol-5-yl]vinyl}-3H-indolium salt; a 1,2-diethyl-2-{2-[6-(4-nitrophenyl)imidazo[2,1-b]thiazol-5-yl]vinyl}imidazo[4,5-b]quinoxalinium salt; a 6-chloro-2-{2-[6-(4-nitrophenyl)imidazo[2,1-b]thiazol-5-yl]vinyl}-1,3-diphenylimidazo[4,5-b]quinoxalinium salt; a 1,3,3-trimethyl-2-{2-[2-methyl-6-(4-nitrophenyl)imidazo[2,1-b]-1,3,4-thiadiazol-5-yl]-vinyl}-5-nitro-3H-indolium salt; a 3-ethyl-2-{2-[2-methyl-6-(4-nitrophenyl)imidazo[2,1 -b]-1,3,4-thiadiazol-5-yl]vinyl}-6-nitrobenzothiazolium salt; a 1,3-diethyl-2-{2-[2-methyl-6-(4-nitropheny)imidazo[2,1-b]-1,3,4-thiadizol-5-yl]vinyl midazo[4,5-b]quinoxalinium salt; a 2-{2-[2-(4-bromophenyl)-6-chloroimidazo[1,2-b]pyridazin-3-yl]vinyl}-3-ethyl-6-nitrobenzothiazolium salt; a 2-{2-[2-(4-bromophenyl)-6-chloroimidazo[1,2-b]pyridazin-3-yl]vinyl}-1,3-diethylimidazo[4,5-b]quinoxalinium salt; a 2-{2-[2-(4-bromophenyl)-6-methoxyimidazo[1,2-b]pyridazin-3-yl]vinyl}-1,3,3-trimethyl-5-nitro-3H-indolium salt; a 2-{2-[2-(4-bromophenyl)-6-chloroimidazo[1,2-b]pyridazin-3-yl]vinyl}-1,3,3-trimethyl-5-nitro-3H-indolium salt; a 2-{2-[2-(4-bromophenyl)-6-methoxyimidazo[1,2-b]pyridazin-3-yl]vinyl}-3-ethyl-6-nitrobenzothiazolium salt; and a 2-{2-[2-(4-bromophenyl)-6-methoxyimidazo-[1,2b]pyridazin-3-yl]vinyl}-1,3-diethylimidazo[4,5-b]quinoxalinium salt.

23. A direct positive emulsion in accordance with claim 10 containing the dye 1,3-diethyl-2-{2-[8-methyl-2-(4-nitrophenyl)imidazo[1,2-a]pyrid-3-yl]vinyl}imidazo[4,5 b]quinoxalinium salt.

24. A photographic element comprising a support having thereon at least one layer containing a direct positive emulsion of claim 1.

25. A photographic element comprising a support having thereon at least one layer containing a direct positive emulsion of claim 7.

26. A photographic element comprising a support having thereon at least one layer containing a direct positive emulsion of claim 8.

27. A photographic element comprising a support having thereon at least one layer containing a direct positive emulsion of claim 10.

28. A photographic element comprising a support having thereon at least one layer containing a direct positive emulsion of claim 20.

29. A photographic element comprising a support having thereon at least one layer containing a direct positive emulsion of claim 21.

* * * * *

PO-1050
(5/69)

UNITED STATES PATENT OFFICE
CERTIFICATE OF CORRECTION

Patent No. 3,615,639          Dated October 26, 1971

Inventor(s) James W. Carpenter, John D. Mee and Donald W. Heseltine

It is certified that error appears in the above-identified patent and that said Letters Patent are hereby corrected as shown below:

In the references cited, "Haseltine et al" should read ---Heseltine et al---.

Column 27, line 42, after "the" insert ---[a]---; line 63, "a" should read ---of---; line 75, "∈°" should read ---68°---.

Column 28, line 1, after "DK-50" insert ---developer---.

Column 29, line 50, "[-b]" should read ---[4,5-b]---; line 54, "[4,5]" should read --- [4,5-b] ---.

Column 30, line 7, "[-a]" should read ---[1,2-a]---; line 9, "[1,2a]" should read --- [1,2-a] ---; line 16, "1,2-" should read --- 1,3- ---; line 25, "midazo" should read ---imidazo---; line 36, "-methoxyimidazo-[1,2b]" should read --- -6-methoxyimidazo[1,2-b]---.

Signed and sealed this 6th day of June 1972.

(SEAL)
Attest:

EDWARD M. FLETCHER, JR.          ROBERT GOTTSCHALK
Attesting Officer          Commissioner of Patents